US011372250B2

(12) United States Patent
Lien et al.

(10) Patent No.: US 11,372,250 B2
(45) Date of Patent: Jun. 28, 2022

(54) HEAD-MOUNTED DISPLAY HAVING REFLECTIVE ELEMENTS

(71) Applicant: HIMAX TECHNOLOGIES LIMITED, Tainan (TW)

(72) Inventors: Jiun-Yi Lien, Tainan (TW); Bo-Han Lyu, Tainan (TW); Meng-Ko Tsai, Tainan (TW); Yin-Tung Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 77 days.

(21) Appl. No.: 16/985,243

(22) Filed: Aug. 5, 2020

(65) Prior Publication Data
US 2021/0096373 A1  Apr. 1, 2021

Related U.S. Application Data

(60) Provisional application No. 62/906,115, filed on Sep. 26, 2019.

(51) Int. Cl.
G02B 27/01 (2006.01)
(52) U.S. Cl.
CPC ..... G02B 27/0172 (2013.01); G02B 27/0176 (2013.01)
(58) Field of Classification Search
CPC ............ G02B 27/0172; G02B 27/0176; G02B 2027/0123
See application file for complete search history.

(56) References Cited

U.S. PATENT DOCUMENTS

| | | | |
|---|---|---|---|
| 7,307,791 B2 * | 12/2007 | Li | G02B 27/0172 359/630 |
| 9,442,291 B1 | 9/2016 | Martinez et al. | |
| 11,054,646 B1 * | 7/2021 | Chan | G02B 27/0955 |
| 2006/0221448 A1 | 10/2006 | Nivon et al. | |
| 2012/0002294 A1 | 1/2012 | Dobschal et al. | |
| 2014/0211146 A1 | 7/2014 | Gupta et al. | |
| 2015/0036221 A1 | 2/2015 | Stephenson | |
| 2016/0377871 A1 | 12/2016 | Kress et al. | |
| 2018/0011322 A1 | 1/2018 | Leighton et al. | |

(Continued)

FOREIGN PATENT DOCUMENTS

| | | |
|---|---|---|
| EP | 2947493 | 11/2015 |
| EP | 3104215 | 12/2016 |

(Continued)

OTHER PUBLICATIONS

"Search Report of Europe Counterpart Application", dated Jul. 16, 2021, p. 1-p. 16.

(Continued)

Primary Examiner — Tracie Y Green
(74) Attorney, Agent, or Firm — JCIPRNET

(57) ABSTRACT

A head-mounted display including a display module is provided. The display module includes a light source configured to provide a light beam and a combiner disposed on a transmission path of the light beam. The combiner includes a plurality of reflective elements spaced apart from each other and obliquely disposed. A maximum width of each of the plurality of reflective elements along an oblique direction thereof is less than 4 mm and greater than 10 μm.

20 Claims, 27 Drawing Sheets

(56) References Cited

U.S. PATENT DOCUMENTS

| | | | |
|---|---|---|---|
| 2018/0017801 A1 | 1/2018 | Chang et al. | |
| 2018/0149869 A1 | 5/2018 | Bergquist | |
| 2018/0252857 A1* | 9/2018 | Glik | G02B 1/002 |
| 2019/0086668 A1 | 3/2019 | Ha | |
| 2019/0129088 A1* | 5/2019 | Lu | B29D 11/00663 |
| 2019/0187482 A1 | 6/2019 | Lanman | |
| 2019/0204601 A1 | 7/2019 | Ha et al. | |

FOREIGN PATENT DOCUMENTS

| | | |
|---|---|---|
| TW | 201917427 | 5/2019 |
| WO | 2017129029 | 8/2017 |
| WO | 2018160506 | 9/2018 |
| WO | 2019068304 | 4/2019 |

OTHER PUBLICATIONS

"Office Action of Taiwan Counterpart Application", dated Feb. 23, 2021, pp. 1-8.
"Search Report of Europe Counterpart Application", dated Feb. 16, 2022, p. 1-p. 9.
"Office Action of Taiwan Counterpart Application", dated Mar. 25, 2022, p. 1-p. 5.

* cited by examiner

HEAD-MOUNTED DISPLAY HAVING REFLECTIVE ELEMENTS

CROSS-REFERENCE TO RELATED APPLICATION

This application claims the priority benefit of U.S. Provisional Application No. 62/906,115, filed on Sep. 26, 2019. The entirety of the above-mentioned patent application is hereby incorporated by reference herein and made a part of this specification.

BACKGROUND

Technical Field

The disclosure relates to an electronic device, and more particularly to a head-mounted display.

Description of Related Art

Augmented reality (AR) is a technology that combines virtual images with actual images. The virtual images may include text or patterns and other display information used to indicate functions or annotations. The display information provided by a light engine is projected to eyes of a user through a combiner that allows light to pass through, so that the virtual image and the actual image can be combined. In recent years, various head-mounted displays for implementing augmented reality have been proposed. However, these head-mounted displays still have many issues (e.g. weight, display quality, or the like) that need to be improved.

SUMMARY

The disclosure provides a head-mounted display, which can provide good display quality under a thin structure.

According to an embodiment of the disclosure, a head-mounted display includes a display module. The display module includes a light source configured to provide a light beam and a combiner disposed on a transmission path of the light beam. The combiner includes a plurality of reflective elements spaced apart from each other and obliquely disposed. A maximum width of each of the plurality of reflective elements along an oblique direction thereof is less than 4 mm and greater than 10 μm.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
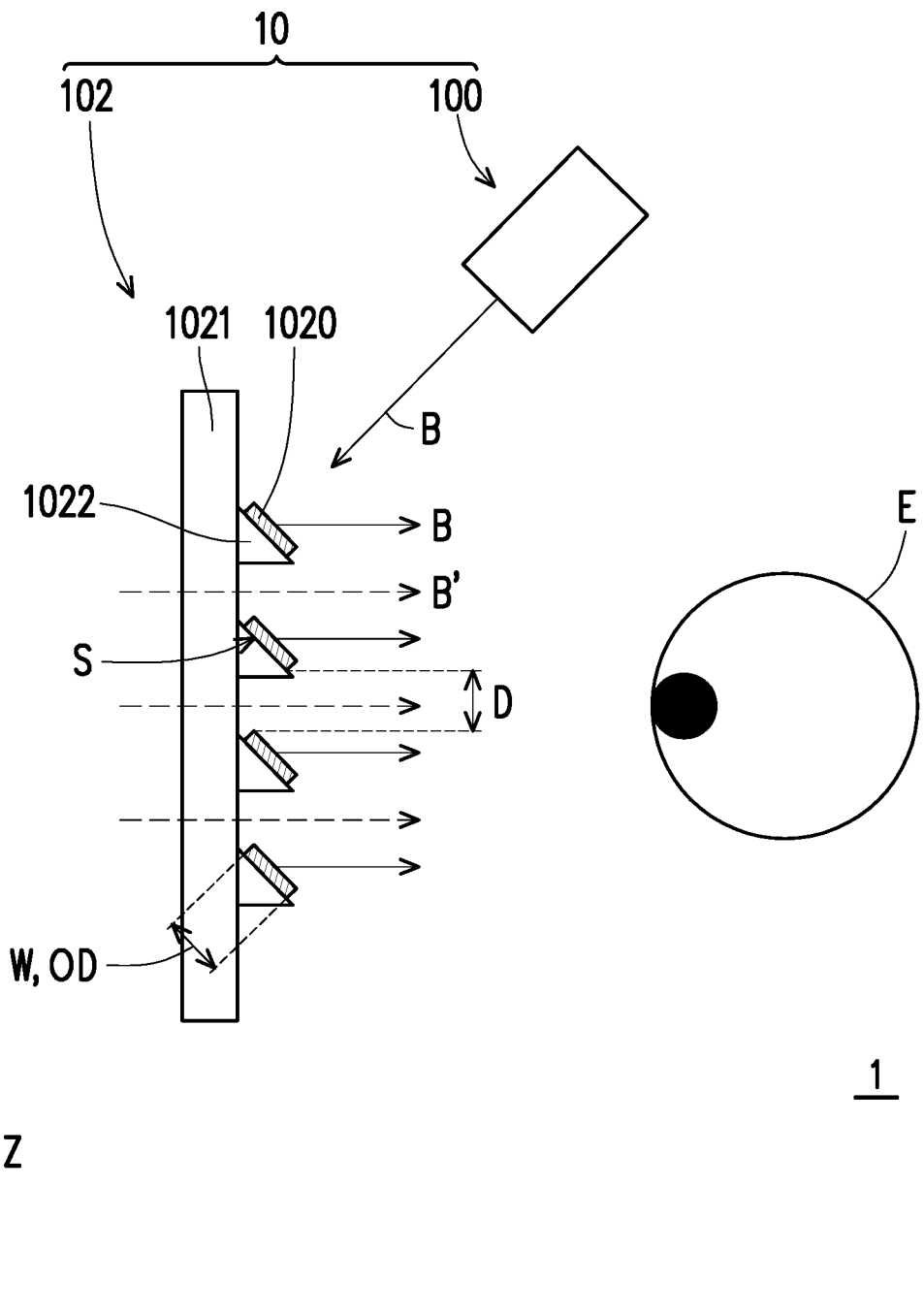
FIG. 1 is a schematic view of a head-mounted display according to a first embodiment of the disclosure.

In the following embodiments, terms used to indicate directions, such as "up," "down," "front," "back," "left," and "right", merely refer to directions in the accompanying drawings. Thus, the directional terms are used for description, but not intended to limit the scope of the disclosure.

In the accompanying drawings, the drawings illustrate the general features of methods, structures, or materials used in the particular exemplary embodiments. However, the drawings should not be interpreted as defining or limiting the scope or nature covered by the exemplary embodiments. For example, for clarity, the relative size, thickness and location of each layer, region or structure may be reduced or enlarged.

In the embodiments, the same or similar elements will be designated by the same or similar reference numerals, and related descriptions will be omitted. In addition, the features of different exemplary embodiments may be combined with each other when they are not in conflict, and simple changes and modifications which are made according to the specification or the claims still pertain to the scope of the application.

In the embodiments, terms such as "first" and "second" mentioned throughout the specification or the claims of this application are only for naming discrete elements or distinguishing different embodiments or scopes and are not intended to limit the upper limit or the lower limit of the number of the elements nor intended to limit manufacturing sequences or disposition sequences of the elements. In addition, when a layer/element (e.g. a first layer/element) is described to be disposed on another layer/element (e.g. a second layer/element), the first layer/element may be directly disposed on the second layer/element with no additional layer(s)/element(s) disposed therebetween; alternatively, the first layer/element may be disposed on the second layer/element with additional layer(s)/element(s) disposed therebetween. On the other hand, when a layer/element (e.g. a first layer/element) is described to be disposed directly on another layer/element (e.g. a second layer/element), the first layer/element is in contact with the second layer/element with no additional layer(s)/element(s) disposed therebetween.

FIG. 1 is a schematic top view of an image capture apparatus according to a first exemplary embodiment of the disclosure. Referring to FIG. 1, a head-mounted display 1 may include a display module 10. The display module 10 is disposed in front of an eye E of a user to provide images to the user. In some alternative embodiments, the head-mounted display 1 may include two display module 10 disposed in front of eyes E of the user. Any of the embodiments in the disclosure may be amended as described above, and will not be repeated below.

The display module 10 may include a light source 100 and a combiner 102. The light source 100 is configured to provide a light beam B with display information. For example, the light source 100 may include a pico-projector having the function of projecting images and capable of adjusting the imaging position, imaging size or the size of the exit pupil of the light source within a certain range. Alternatively, the light source 100 may include a micro display having the ability to display images, and the imaging position, imaging size or the size of the exit pupil of the light source may be adjusted by disposing a lens group or a mirror group between the light source 100 and the combiner 102. In some embodiments, the light source 100 may include a pico-projector, a liquid crystal on silicon display, a digital light processing projector, a micro organic light emitting diode display, a micro light emitting diode display, a micro liquid crystal display, or a laser beam scanning display, but not limited thereto. In some embodiments, the display module 10 may further include an optical element (not shown) disposed on the light path of the light source 100 to adjust the imaging position, imaging size, or the size of the exit pupil of the light source. The optical element may include at least one lens element, at least one mirror, at least one focus tunable lens, or a combination thereof.

The combiner 102 is disposed on a transmission path of the light beam B. The combiner 102 is configured to reflect the light beam B from the light source 100 (i.e. light beam with display information) to the eye E of the user. In addition, the combiner 102 allows light beams B' from the environment ahead (i.e. light beams with environmental information) to pass through, so that the user sees both of the virtual image provided by the light source 100 and the actual image in front of the user.

The combiner 102 includes a plurality of reflective elements 1020 configured to reflect the light beam B. For example, each of the plurality of reflective elements 1020 may include a metal layer, an alloy layer, a distributed Bragg reflector (DBR) or a semi-reflection layer. The semi-reflection layer is an optical layer that has both reflective and light-transmitting properties. The reflectance (or transmittance) of the semi-reflection layer can be changed as required and is not limited to 50%. For example, the material of the plurality of reflective elements 1020 may include metal oxide, such as $SiO_2$, $ZrO_2$, $TiO_2$, but not limited thereto.

The plurality of reflective elements 1020 are spaced apart from each other. In other words, the plurality of reflective elements 1020 are not connected to each other, and a distance D is kept between two adjacent reflective elements 1020 so that the light beams B' with environmental information are able to be transmitted to the eye E through the space between two adjacent reflective elements 1020. As such, the plurality of reflective elements 1020 may be made of materials with high reflectance to enhance the light intensity of the light beam B reflected to the eye E, thereby improving the light utilization rate, the contrast ratio or the color dispersion problems in the existing technique. In some embodiments, the amount of light transmission or the light transmission area may be further increased by increasing the distance D between two adjacent reflective elements 1020.

The plurality of reflective elements 1020 are obliquely disposed to direct the light beam B from the light source 100 to the eye E. In some embodiments, as shown in FIG. 1, the combiner 102 further includes a first substrate 1021 and a plurality of columnar structures 1022 disposed on the first substrate 1021. Each of the plurality of columnar structures 1022 has an inclined surface S, and the plurality of reflective elements 1020 are disposed on the inclined surfaces S of the plurality of columnar structures 1022 in a conformal manner. In some embodiments, the inclined surfaces S of the plurality of columnar structures 1022 may include flat surfaces, convex surfaces, concave surfaces or a combination of at least two of the above, which are inclined with respect to the first substrate 1021. Correspondingly, the plurality of reflective elements 1020 may be flat reflective elements, curved reflective elements or a combination of two of the above, which are inclined with respect to the first substrate 1021. In the embodiment, the inclined surfaces S of the plurality of columnar structures 1022 are flat surfaces, which are inclined with respect to the first substrate 1021. Correspondingly, the plurality of reflective elements 1020 are flat reflective elements, which are inclined with respect to the first substrate 1021.

The first substrate 1021 may be made of a transparent material to allow the light beams B' with environmental information to pass through. In some embodiments, the first substrate 1021 and the plurality of columnar structures 1022 may be integrally formed, and the material of the first substrate 1021 and the plurality of columnar structures 1022 may include glass or plastic, but not limited thereto.

A maximum width W of each of the plurality of reflective elements 1020 along an oblique direction OD thereof is less than 4 mm and greater than 10 μm. For each reflective element 1020, as shown in FIG. 1, the oblique direction OD is a direction parallel to a line connected between a highest end and a lowest end of the reflective element 1020, and the maximum width W refers to a minimum distance from the highest end to the lowest end along the oblique direction OD. The presence of the reflective element 1020 may be reduced by making the maximum width W of the reflective element 1020 in the oblique direction OD smaller than the radius of the pupil (4 mm). Moreover, the influence of the diffraction effect on the image quality (such as color dispersion) can be avoided by making the maximum width W of the reflective element 1020 in the oblique direction OD larger than the size of the diffraction effect (10 μm).

Since the plurality of reflective elements 1020 are small, the overall thickness of the combiner 102 can be reduced, and thus the difficulty to be combined with lens elements can be reduced as well. Moreover, since no additional layers are needed to be disposed on the plurality of reflective elements 1020, the process of the combiner 102 can be simplified. Furthermore, since the transmission medium of the light beam B between the light source 100 and the reflective element 1020 and between the reflective element 1020 and the eye E remains the same (e.g. air), aberrations and distortions of the image can be reduced.

Figure 2:
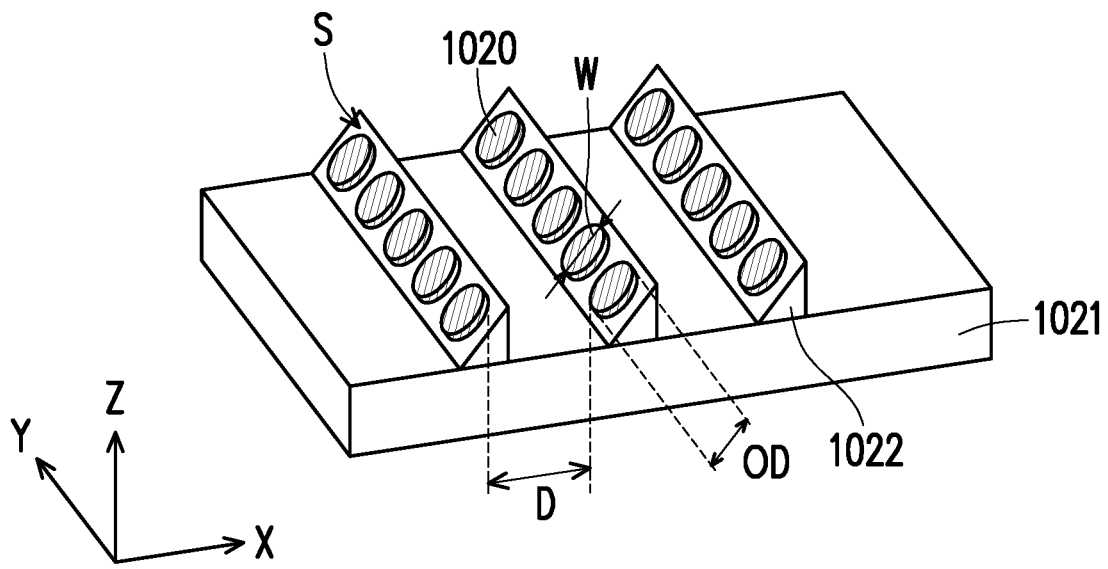
FIGS. 2 to 10 are schematic views of combiners applicable to a head-mounted display of the disclosure.
Figure 3:
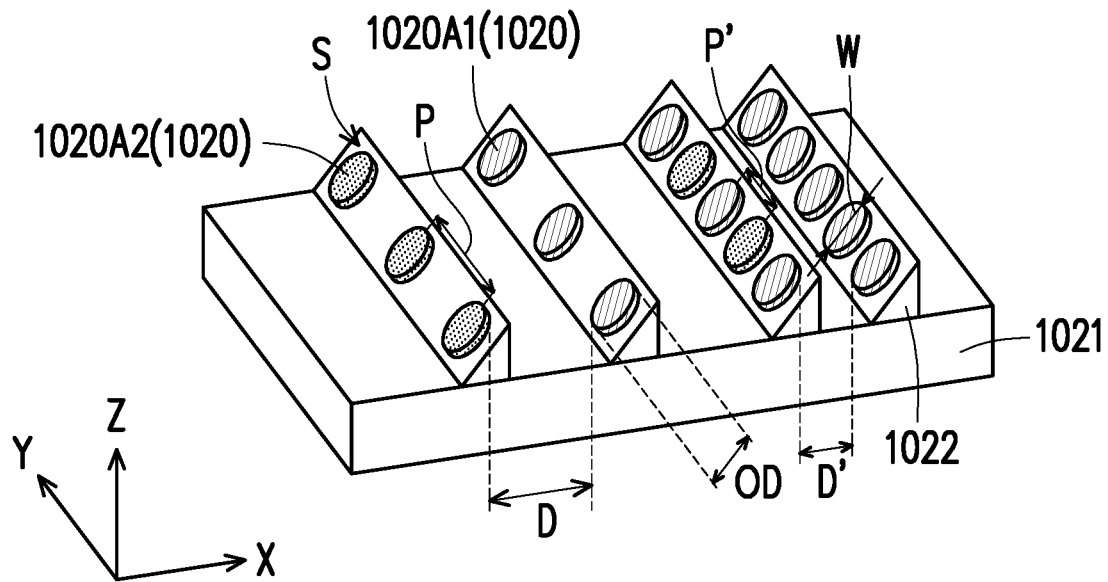
Figure 4:
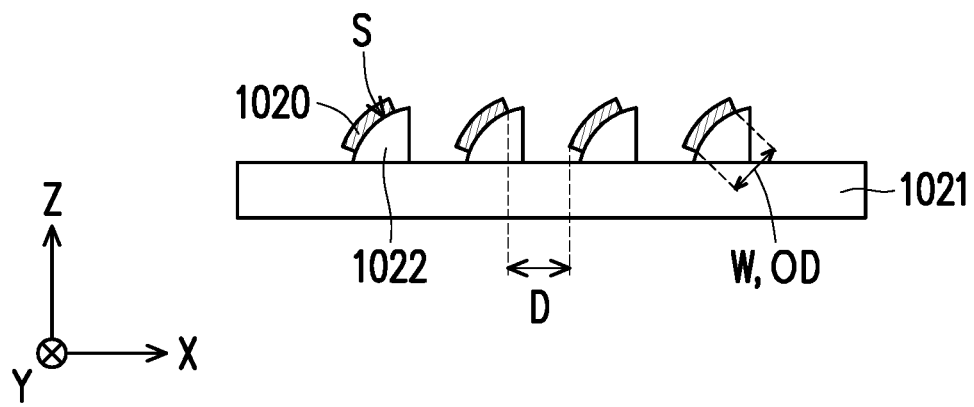
Figure 5:
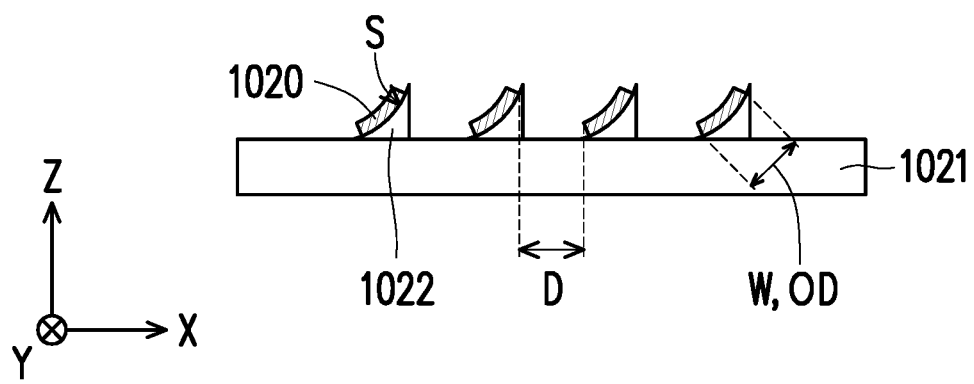
Figure 18:
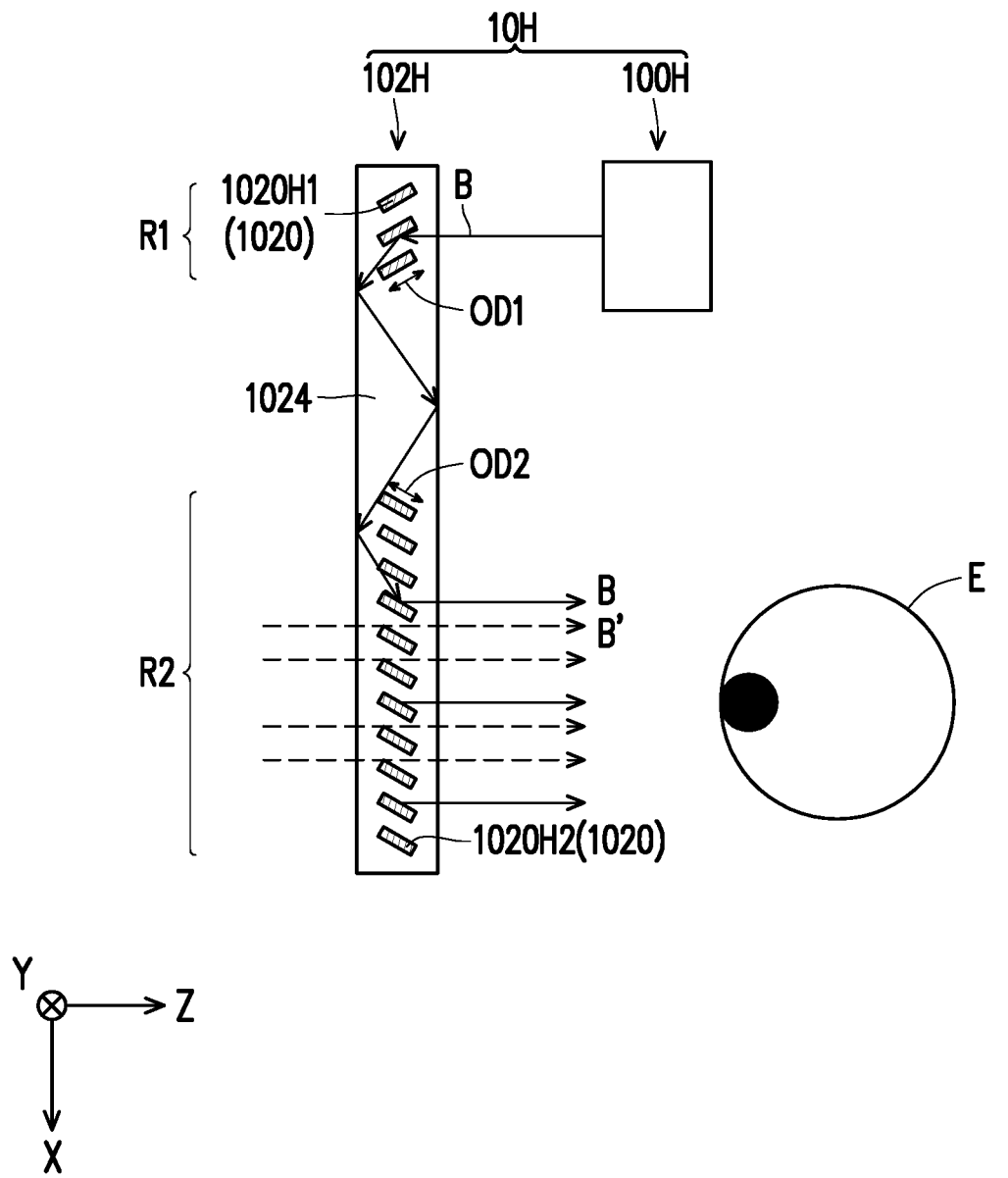
FIG. 18 is a schematic view of a head-mounted display according to a second embodiment of the disclosure.

FIGS. 2 to 10 are schematic views of combiners applicable to a head-mounted display (e.g. the head-mounted display 1 in FIG. 1) of the disclosure, wherein FIGS. 2 and 3 are stereo views, FIGS. 4 and 5 are sectional views, and FIGS. 6 to 10 are top views. In some embodiments, any of the combiners shown in FIGS. 1 to 10 may further include a second substrate (not shown) disposed on the plurality of reflective elements 1020, the first substrate 1021, and the plurality of columnar structures 1022. In some embodiments, the second substrate may have a refractive index the same as or approximate to those of the plurality of columnar structures 1022, as shown in FIG. 18, a light guide plate 1024 may be composed of the first substrate 1021, the plurality of columnar structures 1022, and the second substrate. In some embodiments, the refractive index variation between the plurality of columnar structures 1022 and the second substrate is less than 0.1.

In some embodiments, as shown in FIG. 2, the plurality of columnar structures 1022 are arranged along a direction X, and each columnar structure 1022 extends along a direction Y. A shape of an orthographic projection of the inclined surface S of each of the plurality of columnar structures 1022 on the first substrate 1021 is rectangular, but not limited thereto. The oblique direction OD of each reflective element 1020 is located on an XZ plane composed of the direction X and a direction Z, and the oblique direction OD is neither parallel nor perpendicular to both of the direction X and the direction Z. The reflective elements 1020 located on the same columnar structure 1022 are arranged along the direction Y, and a shape of each reflective element 1020 is round. However, the reflectance of each reflective element 1020, the shape of each reflective element 1020, the arrangement of the plurality of reflective elements 1020, the number of the plurality of reflective elements 1020, the shape of each columnar structure 1022, the arrangement of the plurality of columnar structures 1022, or the number of the plurality of columnar structures 1022 may be changed according to requirement.

In some embodiments, as shown in FIG. 3, the number of the reflective elements 1020 located on different columnar structures 1022 can be different. Moreover, the distance D between two adjacent reflective elements 1020 located on two adjacent columnar structures 1022 arranged along the direction X may be different from the distance D' between two adjacent reflective elements 1020 located on another two adjacent columnar structures 1022 arranged along the direction X. In addition, a pitch P between two adjacent reflective elements 1020 located on one columnar structure 1022 may be different from the pitch P' between two adjacent reflective elements 1020 located on another columnar structure 1022. Furthermore, the plurality of reflective elements 1020 may include a plurality of first reflection layers 1020A1 and a plurality of second reflection layers 1020A2, and reflectance (or transmittance) of each first reflection layer 1020A1 may be different from reflectance (or transmittance) of each second reflection layer 1020A2. For example, the first reflection layer 1020A1 may be a distributed Bragg reflector having a higher reflectance, and the second reflection layer 1020A2 may be a semi-reflection layer having a lower reflectance, but not limited thereto. In some embodiments, the uniformity of the intensity of the image (e.g. the virtual image or the actual image) can be improved by controlling the distribution, arrangement, or reflectance (or transmittance) of the plurality of reflective elements 1020 or the number of the reflective elements 1020 on different columnar structures 1022.

In some embodiments, as shown in FIGS. 4 and 5, the inclined surfaces S of the plurality of columnar structures 1022 may be convex surfaces (FIG. 4) or concave surfaces (FIG. 5), which are inclined with respect to the first substrate 1021. Correspondingly, the plurality of reflective elements 1020 formed on the plurality of columnar structures 1022 may be curved reflective elements, which are inclined with respect to the first substrate 1021. The curvatures of the plurality of reflective elements 1020 can be controlled by controlling the curvatures of the plurality of columnar structures 1022. The field of view or the imaging size or position of the virtual image can be increased by adjusting curvatures or inclination angles of the plurality of reflective elements 1020.

Figure 6:
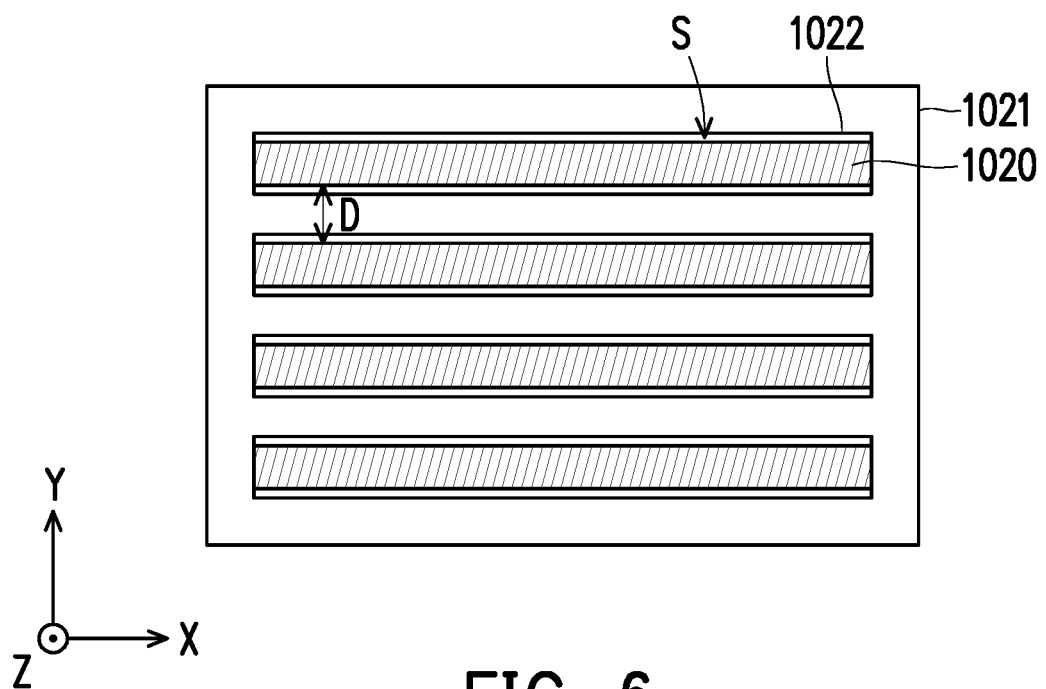

In some embodiments, as shown in FIG. 6, each of the plurality of columnar structures 1022 may be disposed with only one reflective element 1020. The reflective element 1020 may have a shape substantially equal to the shape of the inclined surfaces S of the corresponding columnar structure 1022, and an area of the reflective element 1020 may be equal to or slightly less than an area of the inclined surfaces S of the corresponding columnar structure 1022.

Figure 7:
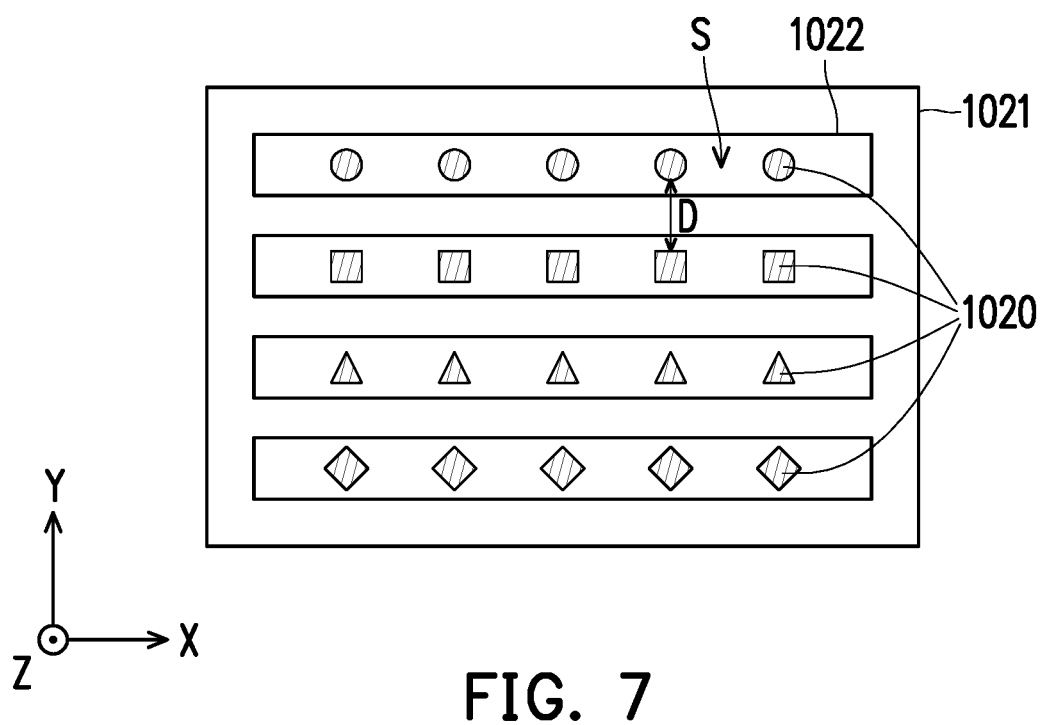

In some embodiments, as shown in FIG. 7, each of the plurality of columnar structures 1022 may be disposed with more than one reflective elements 1020. The plurality of reflective elements 1020 disposed on the plurality of columnar structures 1022 may have various shapes, such as a circle, a square, a triangle, and a diamond, but are not limited thereto. As shown in FIG. 7, the reflective elements 1020 arranged along the direction X may have the same shape, and the reflective elements 1020 arranged along the direction Y may have different shapes. Alternatively, the reflective elements 1020 arranged along the direction Y may have the same shape, and the reflective elements 1020, and the reflective elements 1020 arranged along the direction X may have different shapes.

Figure 8:
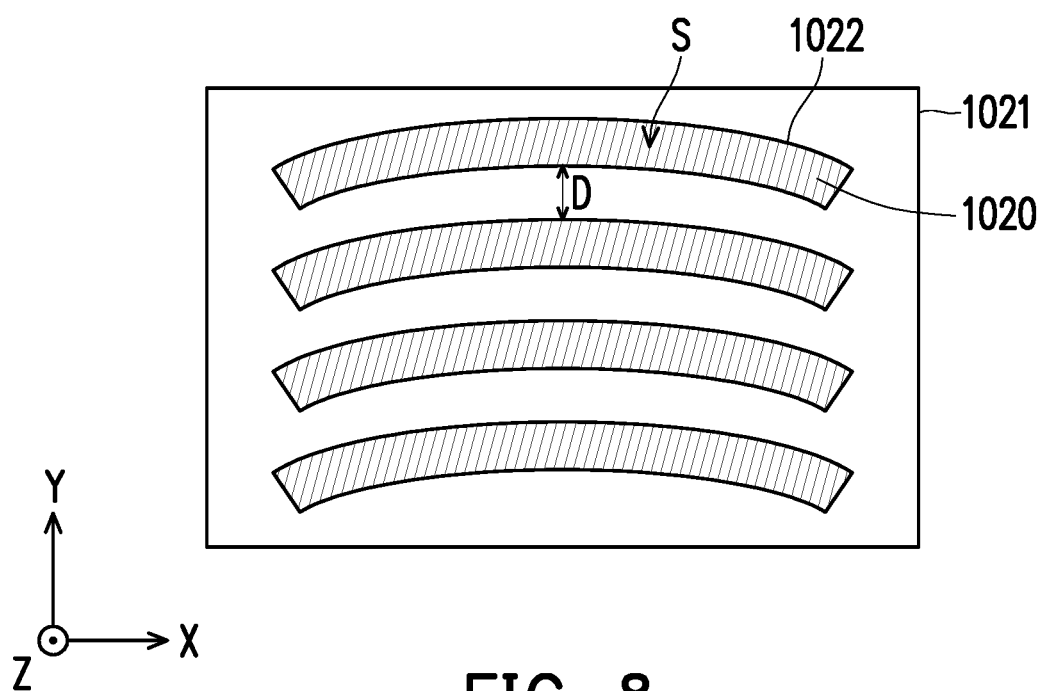
Figure 9:
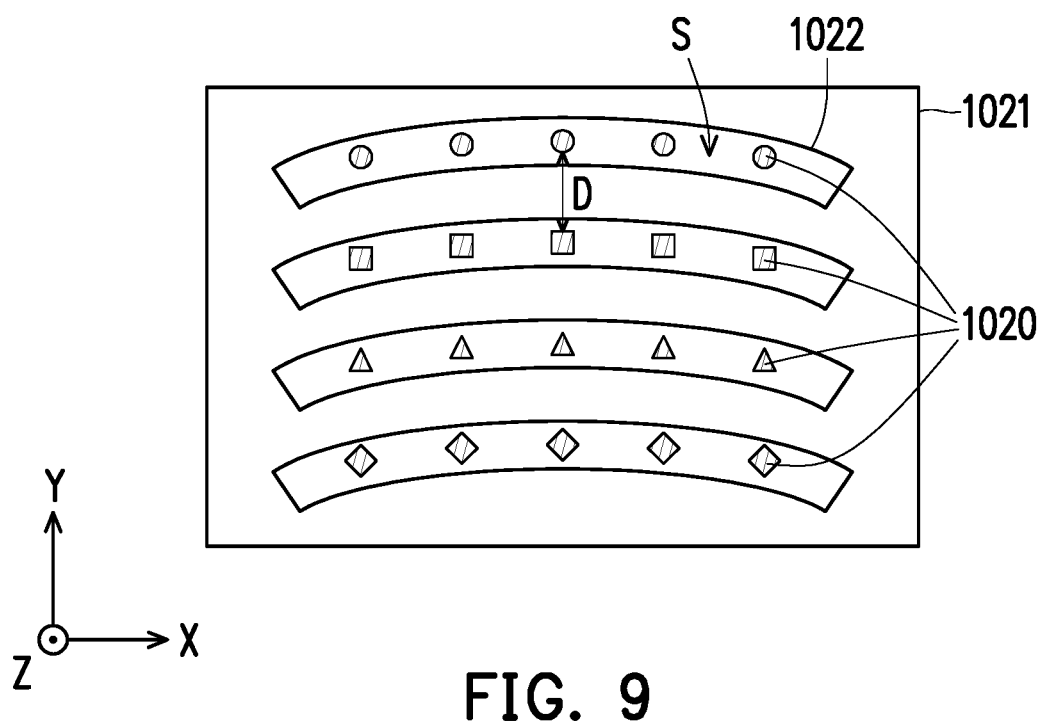

In some embodiments, as shown in FIG. 8, a shape of an orthographic projection of the inclined surface S of each of the plurality of columnar structures 1022 on the first substrate 1021 may be partial ring, while the side view or cross-sectional view of the plurality of columnar structures 1022 and the plurality of reflective elements 1020 may referred to one of FIGS. 2 through 5. The curved lines of the orthographic projection of the inclined surface S may be circular, parabolic, or hyperbolic. The reflective element 1020 may have a shape substantially equal to the shape (a partial ring shape) of the inclined surface S of the corresponding columnar structure 1022, and an area of the reflective element 1020 may be equal to or slightly less than an area of the inclined surface S of the corresponding columnar structure 1022. Alternatively, as shown in FIG. 9, the plurality of reflective elements 1020 may have various shapes different from that of the inclined surface S of the corresponding columnar structure 1022, and each of the columnar structures 1022 may be disposed with more than one reflective elements 1020.

Figure 10:
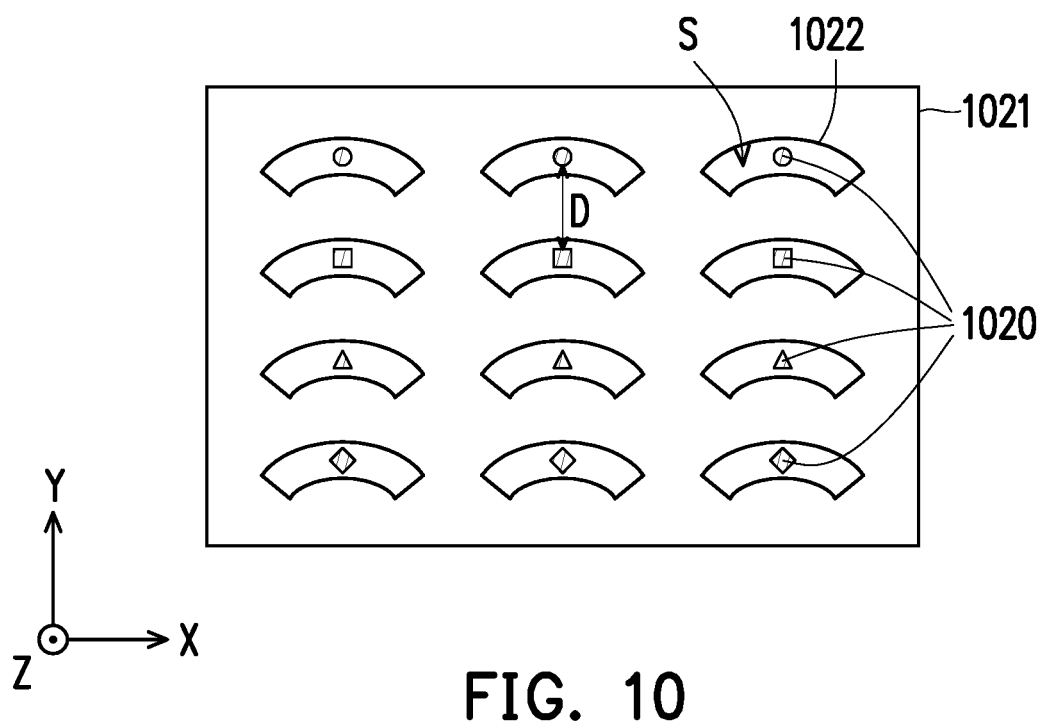

In some embodiments, as shown in FIG. 10, the plurality of columnar structures 1022 may be arranged along directions X and Y, and each of the columnar structures 1022 may be disposed with one reflective element 1020. The reflective element 1020 may have a shape different from or the same as that of the inclined surface S of the corresponding columnar structure 1022.

Figure 11A:
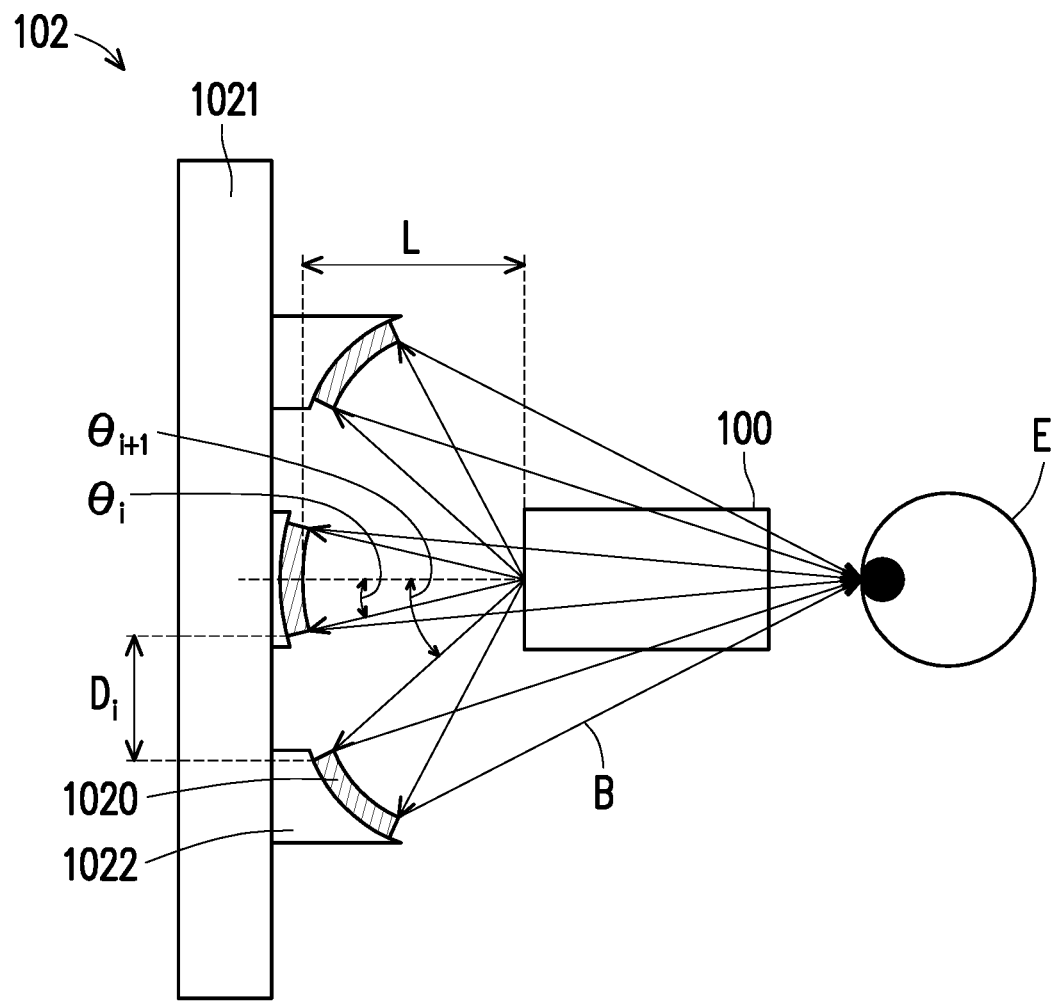
FIG. 11A and FIG. 11B are side view and top view showing an alternative head-mounted display according to the first embodiment of the disclosure.
Figure 11B:
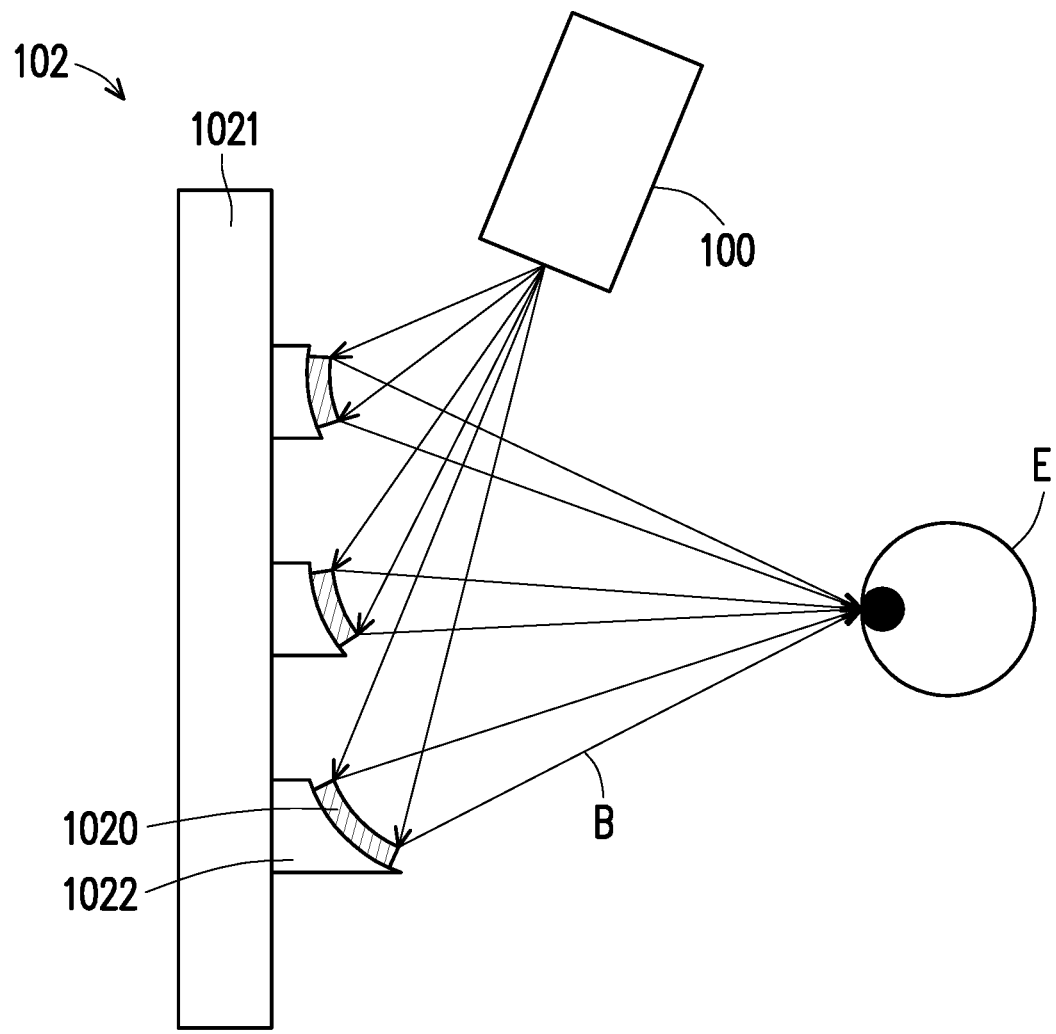

In some embodiments, the light source 100 in FIG. 1 may be a laser beam scanning display or a projector having a narrow beam width, and curvatures or inclination angles of the plurality of reflective elements 1020 in the display module 10 may be changed according to locations of the plurality of reflective elements 1020 (reflective elements 1020 in different positions have different curvatures or inclination angles) to ensure that the light beam B output by the light source 100 at each angle can be reflected to the eye E. As such, the head-mounted display can have the advantages of lightness, thinness, and large field of view. In some embodiments, the design of gradual variation of curvatures or inclination angles of the reflective elements 1020 described above may be used with micro displays (e.g. a micro OLED display, or a micro LED display) to increase the field of view (FoV) or to change the imaging size or position of the virtual image. FIG. 11A and FIG. 11B are side view and top view showing an alternative head-mounted display according to the first embodiment of the disclosure. As shown in FIG. 11A and FIG. 11B, the combiner 102 may be applied to retina projection display technologies. Retina projection display technologies use a projector (e.g., the light source 100) to project a light beam B with a narrow width, in which light beams B with different angles are projected to different pixels and reflected onto the retina through the reflective elements 1020 to form an image. Due to the small beam width (similar to the pinhole effect), the imaging will not be affected by the focus of the human eye, and there is no need to adjust the focal length and enlarge the image, which can reduce the space of the optical element for focal length adjustment. Moreover, by controlling the slope, curvature, height or width of the inclined surface S (shown in FIG. 2) to form a micro-mirror array (or Fresnel mirror) with gradual variation of curvatures or inclination angles (as shown in FIG. 11B), FoV can be increased without affecting the thickness of the combiner 102 and without dispersion of light.

As shown in FIG. 11A and FIG. 11B, the reflective elements 1020 may be curved mirrors arranged along directions X and Y. The curved mirrors can be spherical mirrors or parabolic mirrors, and sizes, shapes, curvatures, slopes, heights, and spacing thereof can vary with corresponding beam angle. Each curved mirror can correspond to multiple angles of light beam B. In some embodiments, the distance Di between the adjacent two curved mirrors satisfies:

$$D_i < L^* |\sin \theta_{i+1} - \sin \theta_i|.$$

L is the shortest distance between the light source 100 and the combiner 102, and L, the $i^{th}$ light beam, and the $i+1^{th}$ light beam are on the same plane. $\theta_i$ is the angle included between the dashed line and the $i^{th}$ light beam.

In some alternative embodiments, the reflective elements 1020 may be non-curved mirrors tilted relative to the first substrate 1021, and each non-curved mirror is suitable for reflecting light beams at a single angle. By changing the size, shape, slope, height or spacing of the non-curved mirror, light beams of different angles can be focused to the human eye and imaged on the retina.

Figure 27A:
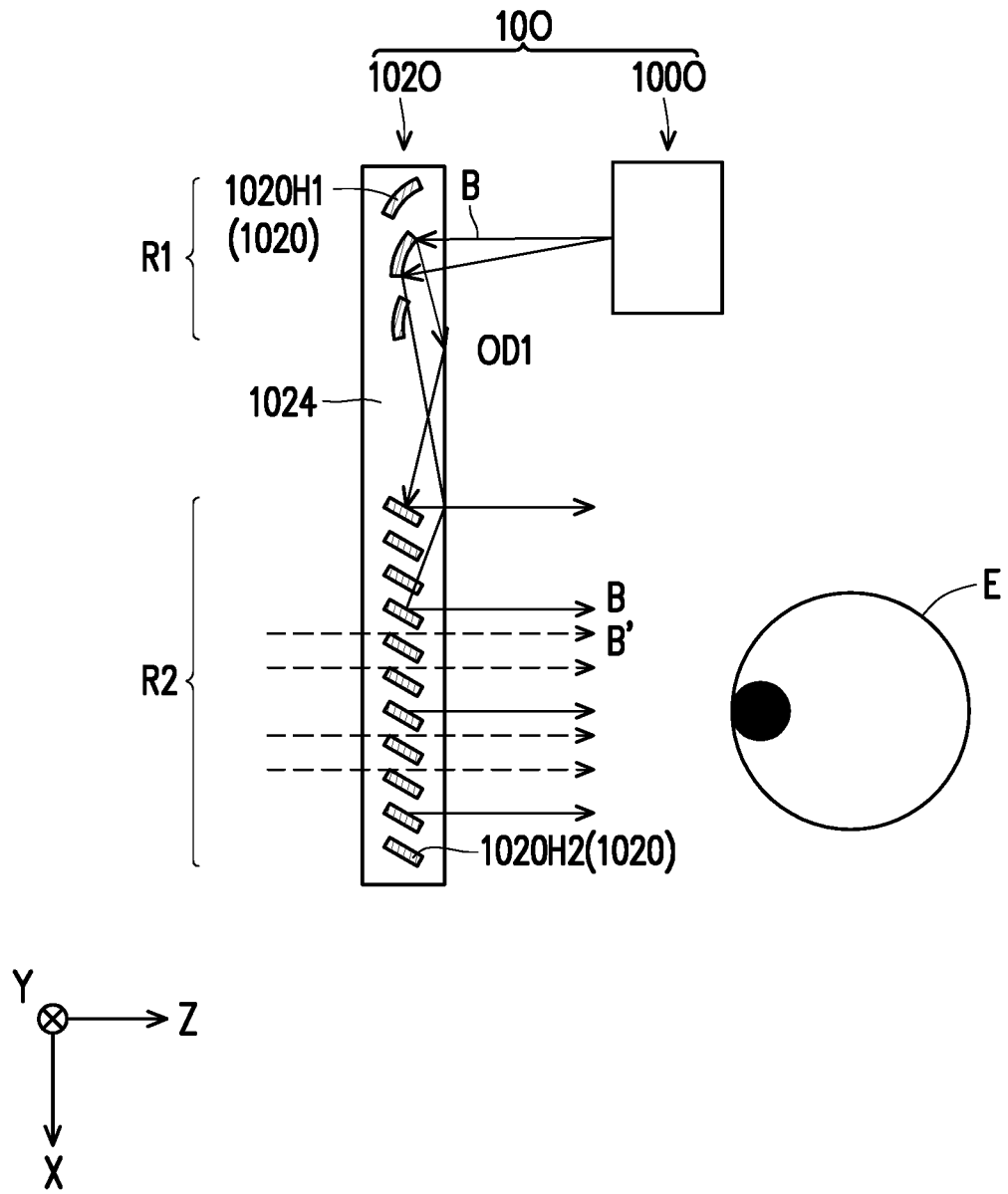
FIG. 27A is a schematic view of a head-mounted display according to a sixth embodiment of the disclosure.
Figure 27B:
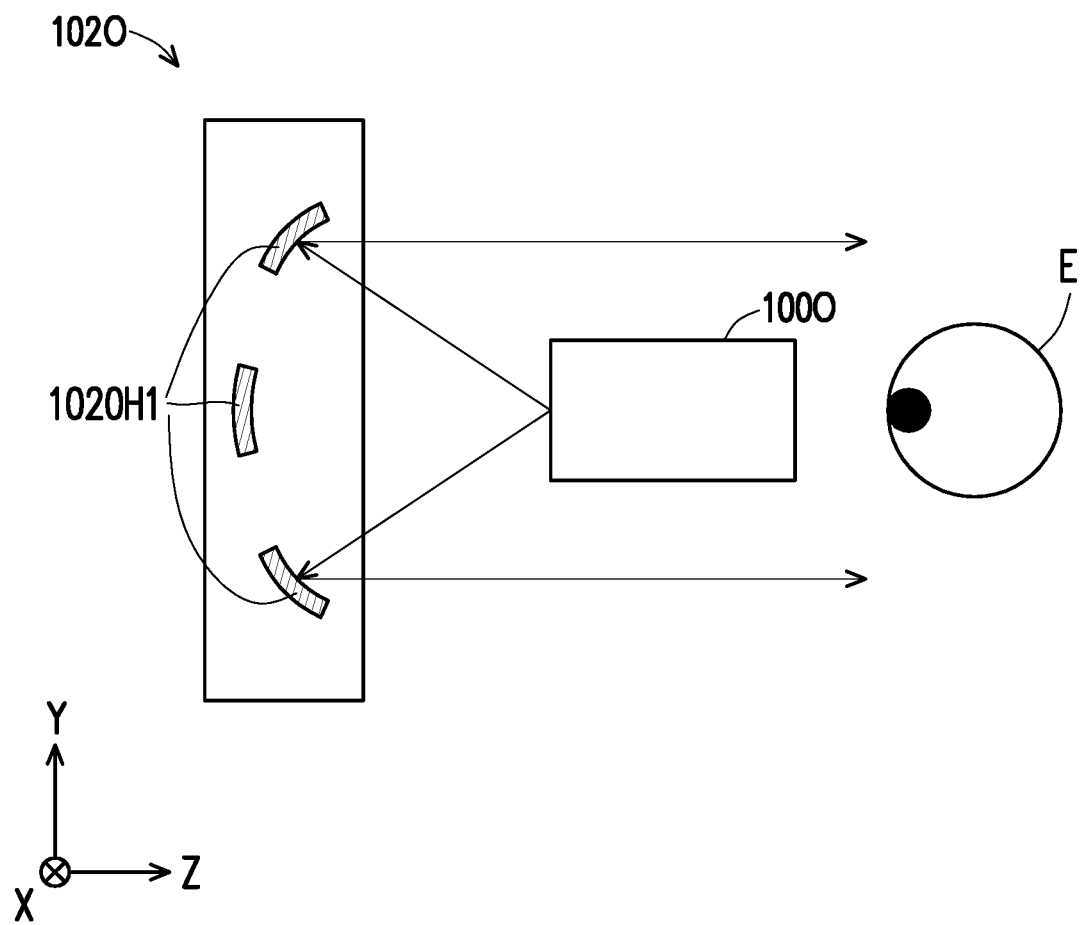
FIG. 27B is a schematic side view of a combiner applicable to a head-mounted display of the disclosure.
Figure 27C:
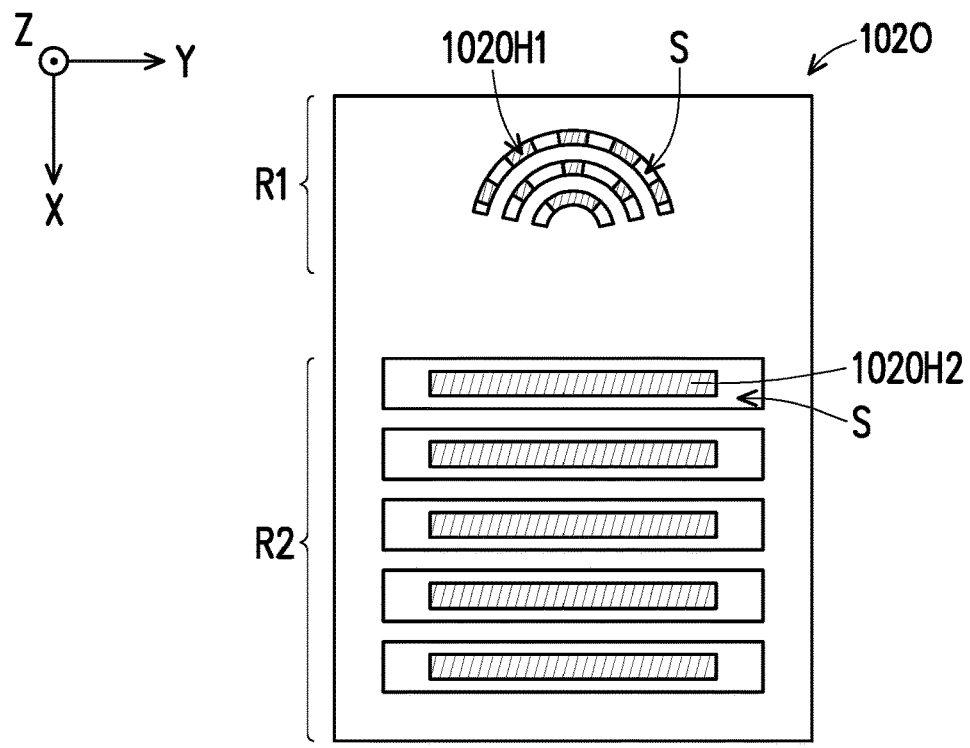
FIG. 27C is a schematic front view of a combiner applicable to a head-mounted display of the disclosure.
Figure 28:
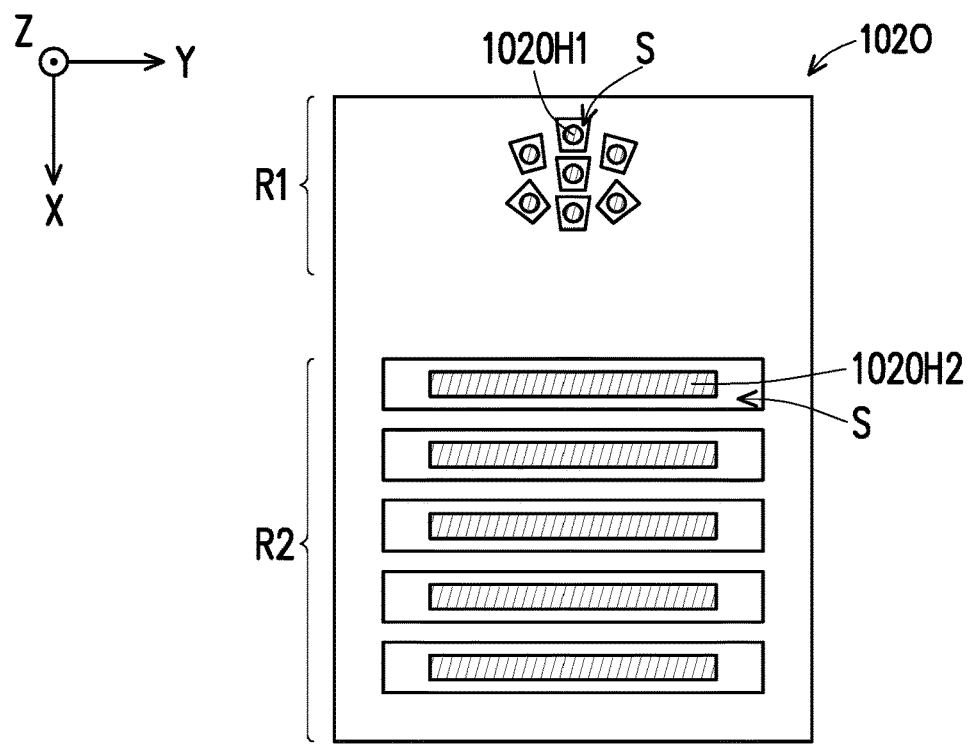
FIG. 28 is a schematic front view of an alternative combiner applicable to a head-mounted display of the disclosure.

The front view of the combiner 102 may be referred to the upper portion (see the pattern in the light input region R1) of the combiner 102O in FIG. 27C or FIG. 28.

Figure 12:
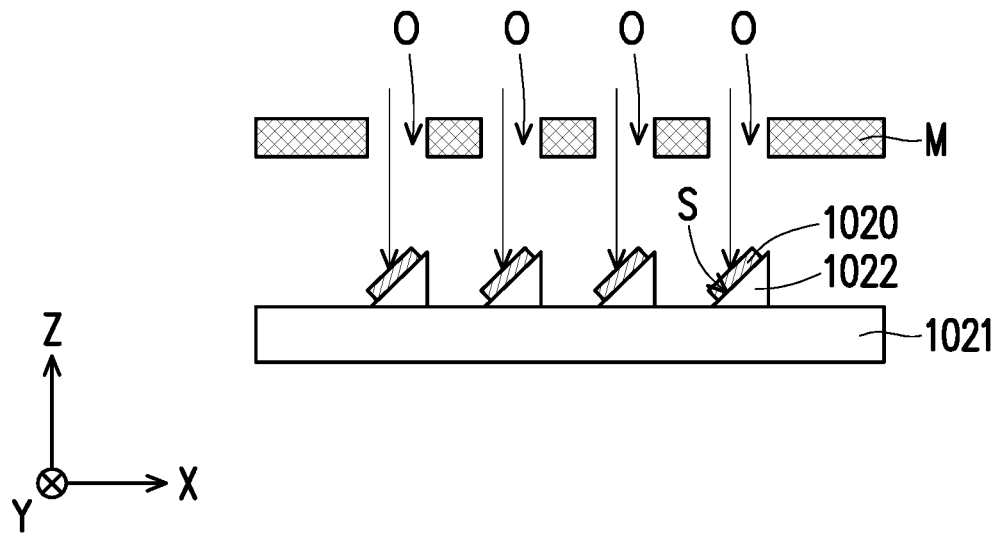
FIG. 12 is a schematic view that shows a manufacturing process of a combiner applicable to a head-mounted display of the disclosure.

FIG. 12 is a schematic view that shows a manufacturing process of a combiner (e.g. the combiner 102 in FIG. 1 or any combiner in the disclosure) applicable to a head-mounted display of the disclosure. Referring to FIG. 12, the plurality of reflective elements 1020 may be formed on the inclined surface S of the plurality of columnar structures 1022 by using a coating process. In the coating process, a mask M is located above the plurality of columnar structures 1022 and the first substrate 1021. Openings O of the mask M are overlapped with the inclined surfaces S of the plurality of columnar structures 1022 along the direction Z, so that material of the reflective elements 1020 are formed on the inclined surfaces S of the plurality of columnar structures 1022 without forming on the first substrate 1021.

Figure 13:
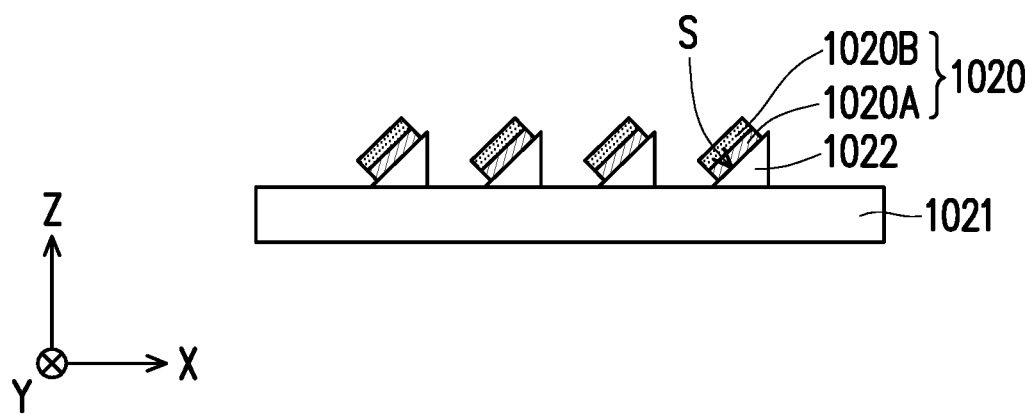
FIG. 13 is a schematic sectional view of a combiner applicable to a head-mounted display of the disclosure.

FIG. 13 is a schematic sectional view of a combiner applicable to a head-mounted display of the disclosure. In some embodiments, as shown in FIG. 13, each of the plurality of reflective elements 1020 may include a reflection layer 1020A and an absorption layer 1020B. The reflection layer 1020A and the absorption layer 1020B may be formed on the inclined surface S of each of the plurality of columnar structures 1022 in sequence or in a reverse sequence. In the configuration of FIG. 1, the absorption layer 1020B may be located at the back of the reflection layer 1020A (i.e. the reflection layer 1020A is closer to the light source 100 than the absorption layer 1020B) to prevent outsiders from seeing virtual images and to prevent crosstalk images from generation.

Figure 14:
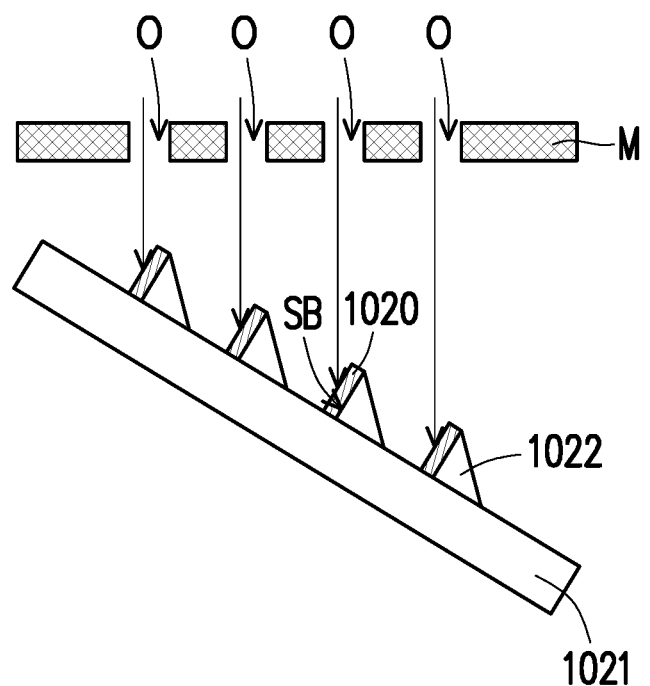
FIG. 14 is a schematic view that shows another manufacturing process of a combiner applicable to a head-mounted display of the disclosure.

FIG. 14 is a schematic view that shows another manufacturing process of a combiner applicable to a head-mounted display of the disclosure. In some embodiments, as shown in FIG. 14, a plurality of reflective elements 1020 close to or equal to 90 degrees can be formed on the back surfaces SB of the plurality of columnar structures 1022 by changing the inclination angle of the first substrate 1021. The application of this kind of combiner will be described later.

Figure 15:
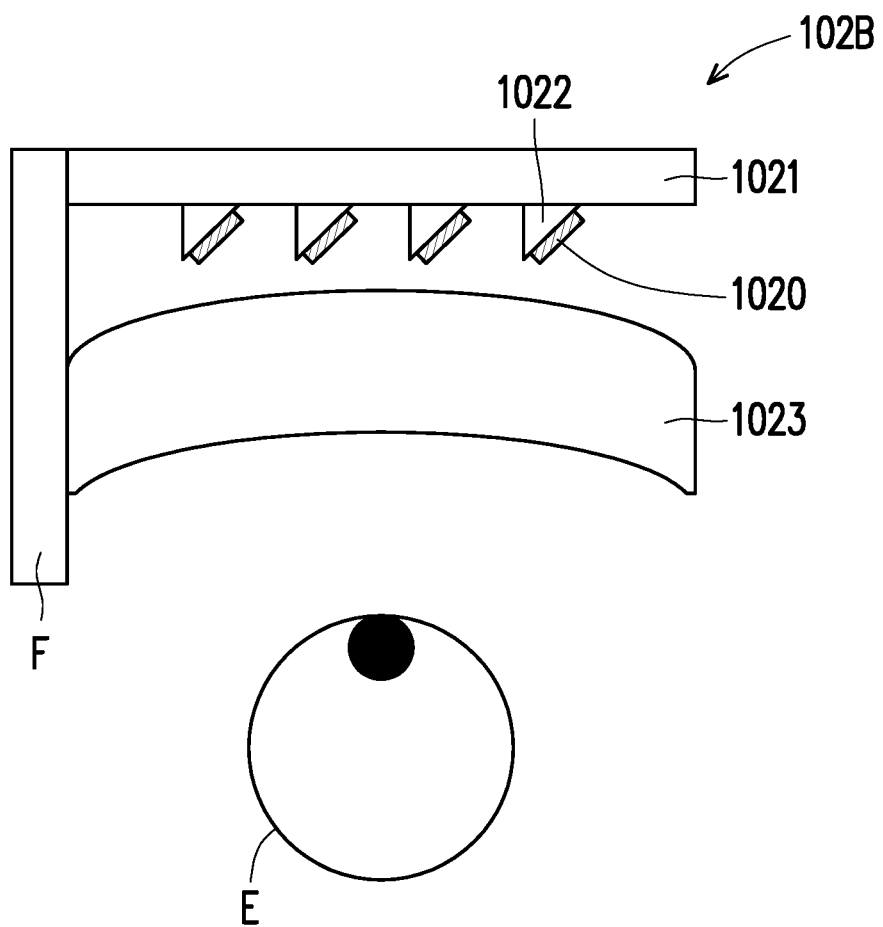
FIGS. 15 to 17 are schematic views of combiners applicable to a head-mounted display of the disclosure.
Figure 16:
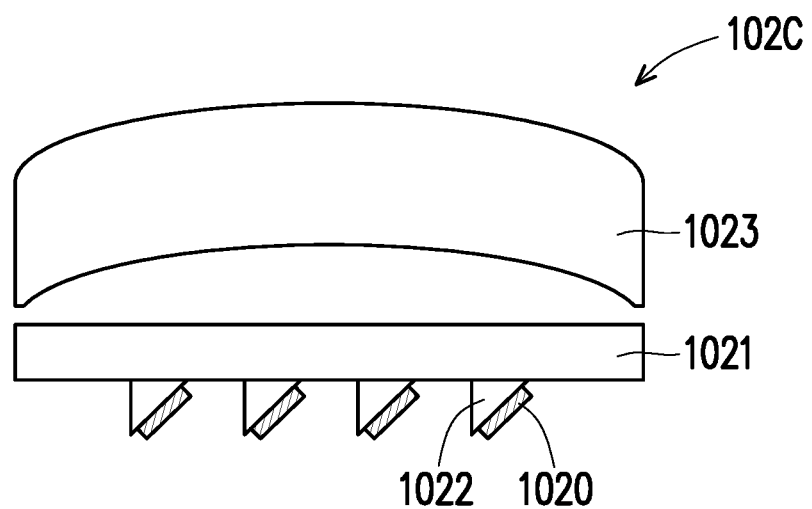
Figure 16:
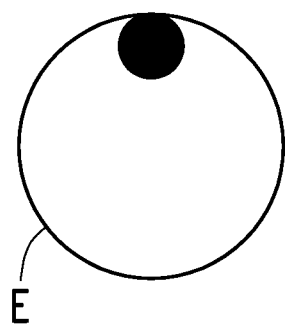
Figure 17:
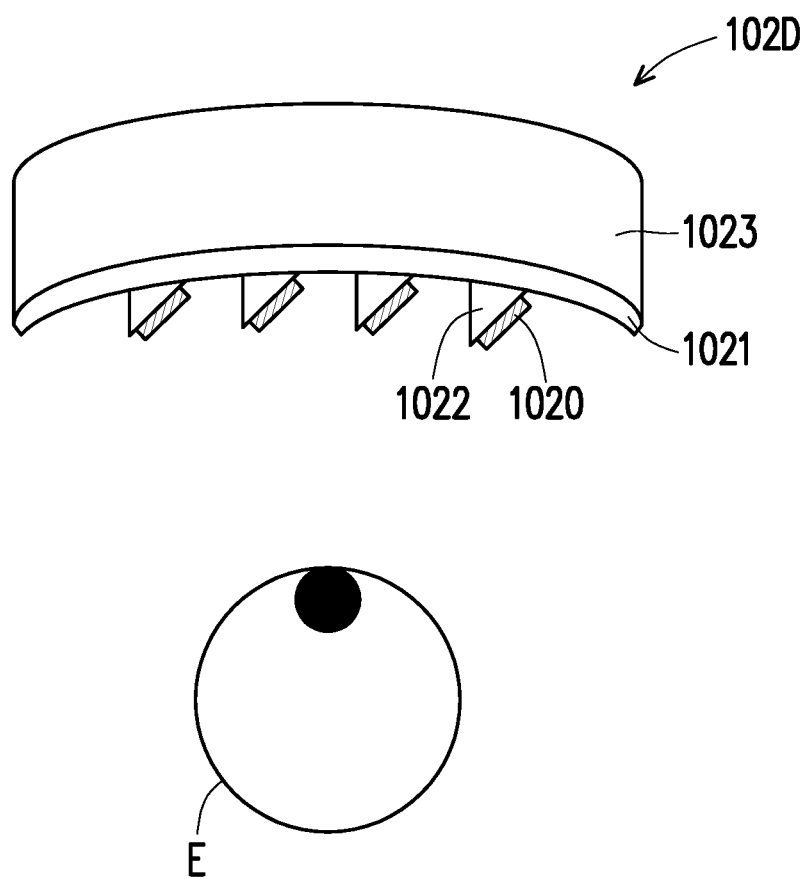

FIGS. 15 to 17 are schematic views of combiners applicable to a head-mounted display (e.g. the head-mounted display 1 in FIG. 1) of the disclosure. In FIGS. 15 to 17, to understand the relative disposition relationship between the user and the combiner, the eye E of the user is further illustrated.

In some embodiments, as shown in FIG. 15, a combiner 102B may include a second substrate 1023 and a fixing element F in addition to the plurality of reflective elements 1020, the first substrate 1021 and the plurality of columnar structures 1022. The second substrate 1023 may be overlapped with the first substrate 1021, the plurality of columnar structures 1022 and the plurality of reflective elements 1020.

The fixing element F of a combiner 102B may be a frame fixed at a side of the first substrate 1021 and the second substrate 1023, wherein the plurality of columnar structures 1022 and the plurality of reflective elements 1020 are located between the first substrate 1021 and the second substrate 1023. Since the plurality of reflective elements 1020 are located between the first substrate 1021 and the second substrate 1023, the plurality of reflective elements 1020 can be prevented from being damaged (such as scratched). In some embodiments, at least one of the first substrate 1021 and the second substrate 1023 may be a lens element to provide vision correction. In other words, at least one of the first substrate 1021 and the second substrate 1023 may have refractive power. For example, as shown in FIG. 15, the second substrate 1023 may be a convex-concave lens or a concave-convex lens, whereas the first substrate 1021 may be a plate without refractive power, but not limited thereto. In some embodiments, one of the first substrate 1021 and the second substrate 1023 may be a polarizer or having low transmittance, so that the combiner 102B may serve as pigmented or polarized sunglasses. For example, as shown in FIG. 15, the first substrate 1021 located at the back of the plurality of reflective elements 1020 (viewed from the eye E) may be a polarizer or having transmittance lower than that of the second substrate 1023, so that the combiner 102B may serve as pigmented or polarized sunglasses. Any of the embodiments disclosed in this disclosure can be modified as described above, and thus will not be repeated below.

In some embodiments, as shown in FIG. 16, a combiner 102C may not have the fixing element F shown in FIG. 15. Moreover, the first substrate 1021 may be located between the second substrate 1023 and the plurality of columnar structures 1022.

In some embodiments, as shown in FIG. 17, the first substrate 1021 of a combiner 102D may be a flexible film attached to the second substrate 1023, and the first substrate 1021 is located between the second substrate 1023 and the plurality of columnar structures 1022.

Figure 19:
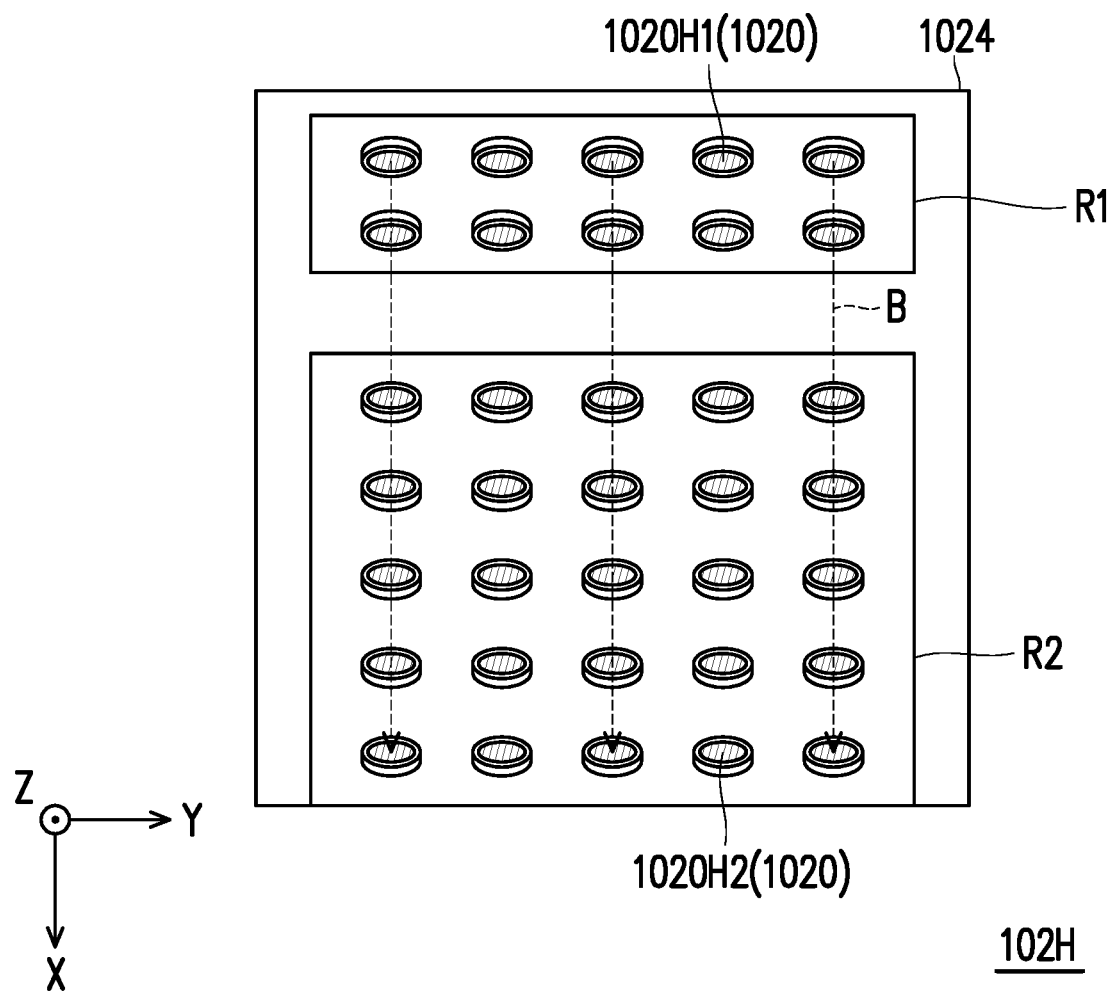
FIGS. 19 to 21 are schematic views of combiners applicable to a head-mounted display of the disclosure.
Figure 20:
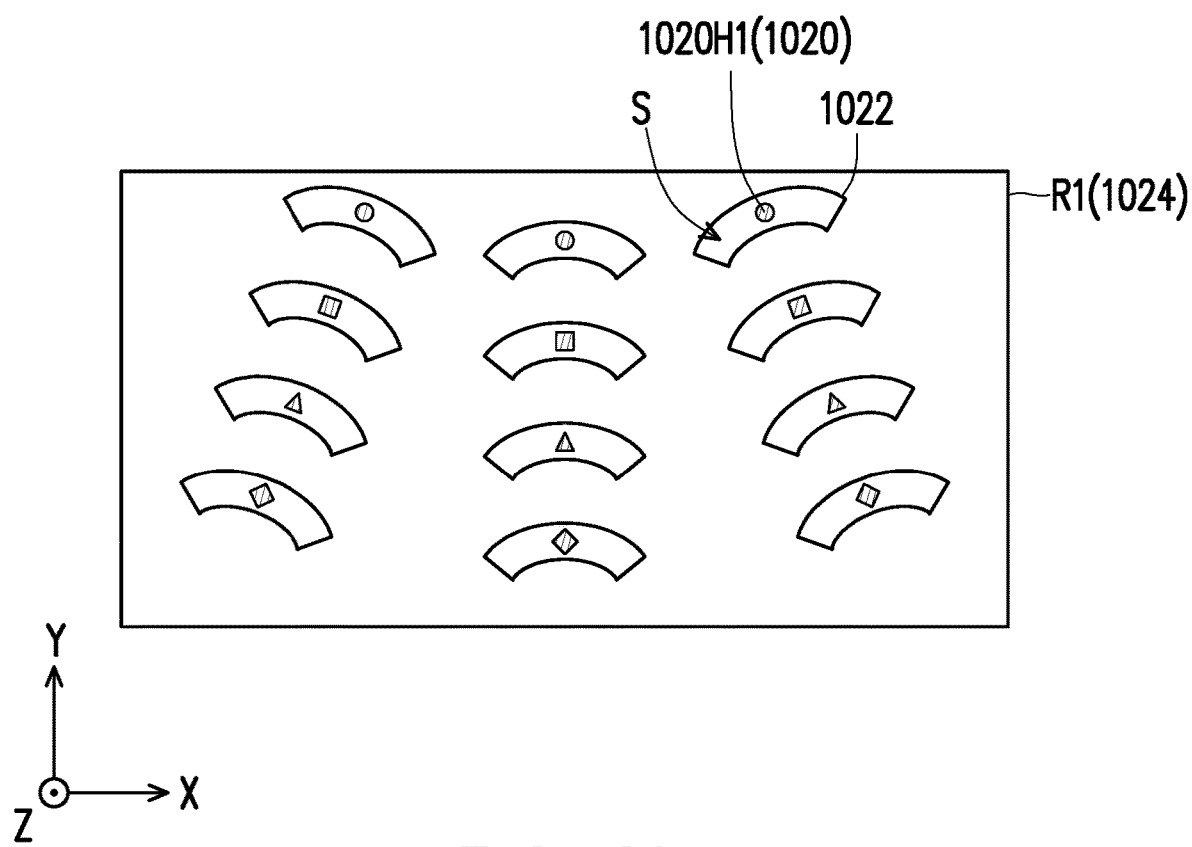
Figure 21:
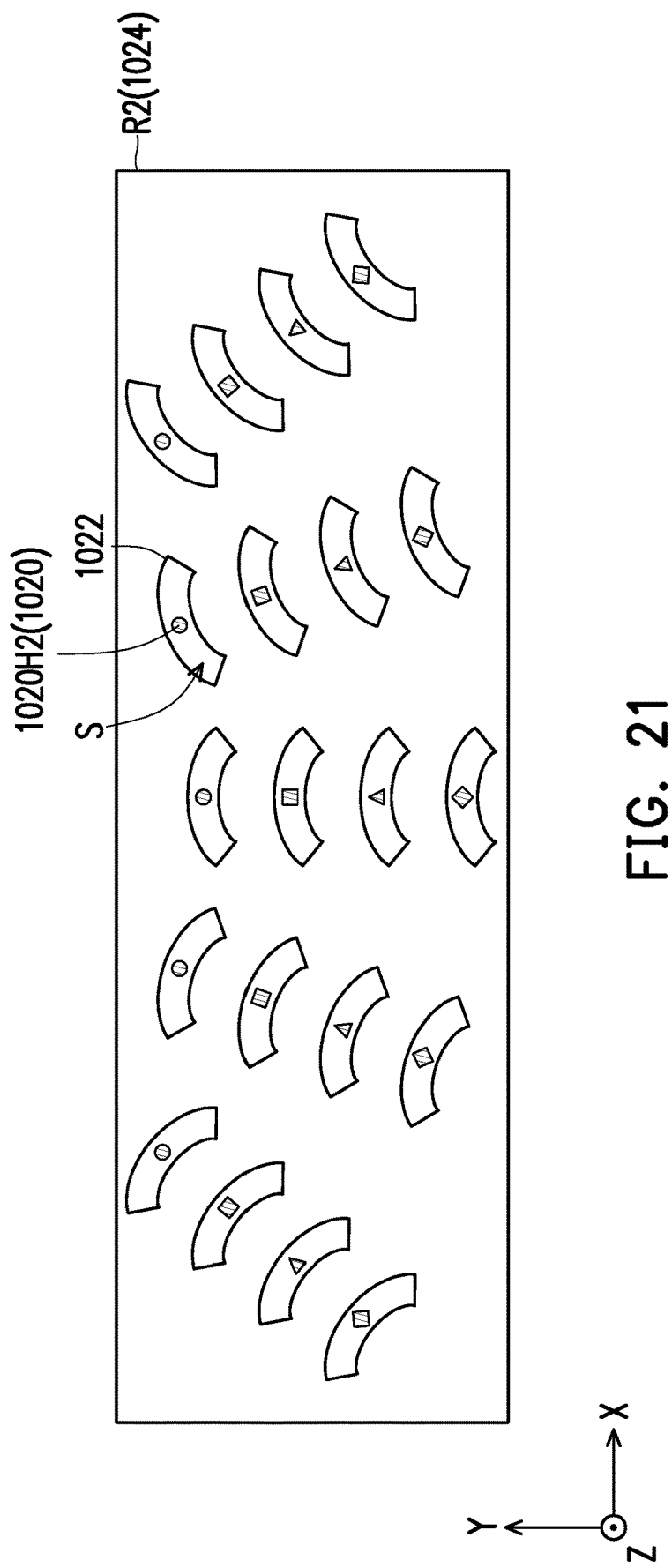

FIG. 18 is a schematic view of a head-mounted display according to a second embodiment of the disclosure. FIGS. 19 to 21 are schematic views of combiners applicable to a head-mounted display (e.g., a head-mounted display 1E of FIG. 18) of the disclosure. Referring to FIG. 18 and FIG. 19, the main difference between a head-mounted display 1H and the head-mounted display 1 in FIG. 1 is described below.

The head-mounted display 1H includes a display module 10H. The display module 10H includes a light source 100H and a combiner 102H. The light source 100H is, for example, a liquid crystal on silicon display. In some embodiments, as shown in FIG. 18, the light source 100H may be disposed on a side of the combiner 102H that faces the eye E. Alternatively, the light source 100H may be disposed on a side of the combiner 102H that faces away from the eye E.

The combiner 102H includes a plate (hereinafter referred to as "light guide plate 1024") in addition to the plurality of reflective elements 1020. The plurality of reflective elements 1020 are disposed in the plate (light guide plate 1024) composed of the first substrate 1021, the plurality of columnar structures 1022 and the second substrate 1023. In some embodiments, the combiner 102H may be formed by forming the second substrate 1023 directly on the first substrate 1021, the plurality of reflective elements 1020 and the plurality of columnar structures 1022, wherein the plurality of columnar structures 1022 and the second substrate 1023 are made of the same material or different materials having difference of refractive indices less than 0.1, so that no obvious interface exists between the plurality of columns and the second substrate when the plate (light guide plate 1024) is formed. In some embodiments, materials of the first substrate 1021, the plurality of columnar structures 1022 and the second substrate 1023 may be selected from glass, UV-cured or thermal-cured organic materials, or mixtures thereof.

As shown in FIG. 18, the plurality of reflective elements 1020 may be arranged along the same or different oblique directions. In some embodiments, the plurality of reflective elements 1020 may include a plurality of first reflective elements 1020H1 and a plurality of second reflective elements 1020H2. The plurality of first reflective elements 1020H1 are disposed in a light input region R1 of the light guide plate 1024, and the plurality of second reflective elements 1020H2 are disposed in a light output region R2 of the light guide plate 1024. The light input region R1 is overlapped with the light source 100H along the direction Z, and the light output region R2 is overlapped with an eye box of the eye E. An oblique direction OD1 of the plurality of first reflective elements 1020H1 may be identical to or different from an oblique direction OD2 of the plurality of second reflective elements 1020H2. In the embodiments where the light source 100H and the eye box of the eye E are located at the same side of the combiner 102H, as shown in FIG. 18, the oblique direction OD1 of the plurality of first reflective elements 1020H1 may be different from the oblique direction OD2 of the plurality of second reflective elements 1020H2. In the embodiments where the light source 100H and the eye box of the eye E are respectively located at opposite sides of the combiner 102H, the oblique direction OD1 of the plurality of first reflective elements 1020H1 may be identical to the oblique direction OD2 of the plurality of second reflective elements 1020H2.

Specifically, the plurality of first reflective elements 1020H1 are configured to reflect the light beam B from the light source 100H toward the plurality of second reflective elements 1020H2. The light beam B transmitted from the plurality of first reflective elements 1020H1 may be transmitted to the plurality of second reflective elements 1020H2 through total internal reflection (TIR). The plurality of second reflective elements 1020H2 are configured to reflect the light beam B transmitted thereto to the eye E of the user.

In some embodiments, the uniformity of the intensity of the image (e.g. the virtual image or the actual image) may be improved by adjusting the reflectance (or transmittance) of each reflective element 1020, the shape of each reflective element 1020, the arrangement of the plurality of reflective elements 1020 (e.g. the distance between two adjacent reflective elements 1020 along the direction X or Y) or the number of the plurality of reflective elements 1020.

In some embodiments, each reflective element 1020 may include an absorption layer 1020B (shown in FIG. 13) to prevent outsiders from seeing virtual images and to prevent crosstalk images from generation.

In some embodiments, the exit pupil or the imaging size or position of the virtual image can be increased by adjusting curvatures or inclination angles of at least one of the plurality of first reflective elements 1020H1 and the plurality of second reflective elements 1020H2. As shown in FIGS. 20 and 21, a two-dimensional (2D) exit-pupil expansion can be achieved (i.e. eye box along the directions X and Y can be enlarged) through reflective elements 1020 designed at different curvatures or different inclination angles, and thus increases the user's eye box without increasing the size of the light source (image generator).

Figure 22A:
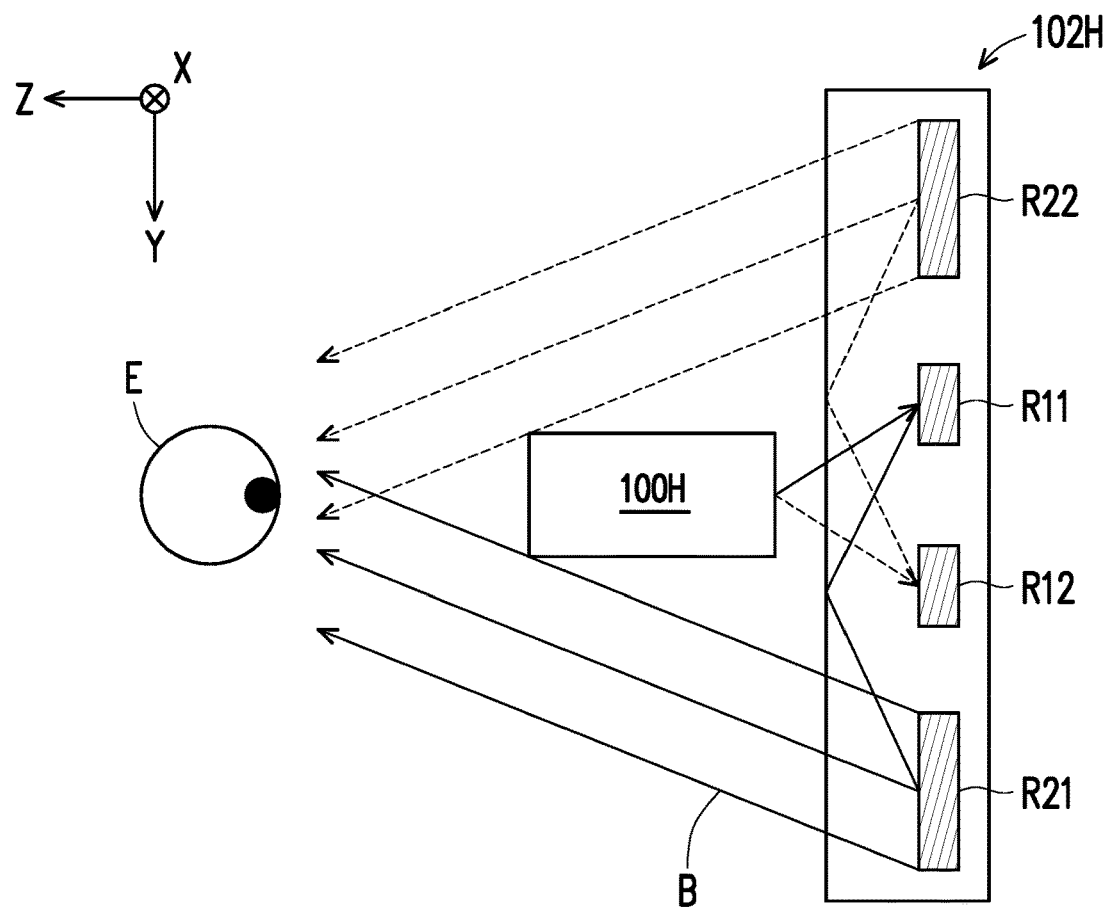
FIG. 22A is a schematic view of a head-mounted display according to a third embodiment of the disclosure.
Figure 22B:
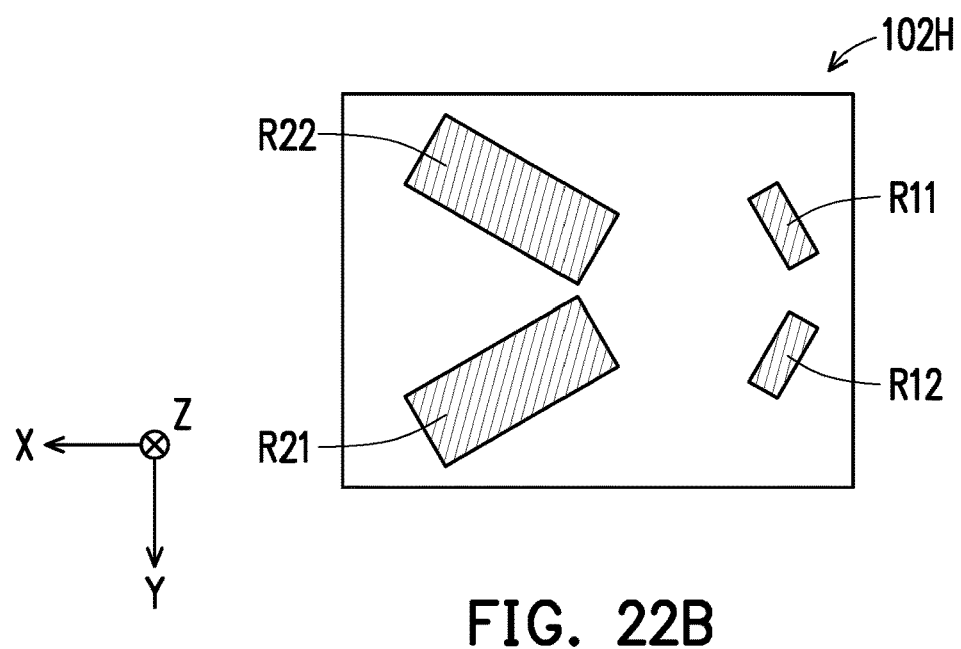
FIG. 22B is a schematic front view of a combiner applicable to a head-mounted display of the disclosure.

FIG. 22A is a schematic view of a head-mounted display according to a third embodiment of the disclosure. FIG. 22B is a schematic front view of a combiner applicable to a head-mounted display (e.g., the head-mounted display in FIG. 22A) of the disclosure. In some embodiments, as shown in FIG. 22A and FIG. 22B, the light input region may have a plurality of light input sub regions (e.g., the light input sub region R11 and the light input sub region R12), and the plurality of first reflective elements (not shown in FIG. 22A and FIG. 22B) disposed in different light input sub regions (e.g., the light input sub region R11 and the light input sub region R12) may have different oblique directions. Similarly, the light output region may have a plurality of light output sub regions (e.g., the light output sub region R21 and the light output sub region R22), and the plurality of second reflective elements (not shown in FIG. 22A and FIG. 22B) disposed in different light output sub regions (e.g., the light output sub region R21 and the light output sub region R22) may have different oblique directions. Specifically, the light input sub region R11 is adapted to reflect the light beam B from the light source 100H to the light output sub region R21, and the light output sub region R21 is adapted to reflect the light beam B from the light input sub region R11 to the eye E. Similarly, the light input sub region R12 is adapted to reflect the light beam B from the light source 100H to the light output sub region R22, and the light output sub region R22 is adapted to reflect the light beam B from the light input sub region R21 to the eye E. By adjusting the direction, position or curvature of the reflective elements in the sub-regions, the two-dimensional exit-pupil expansion can be achieved.

Figure 23:
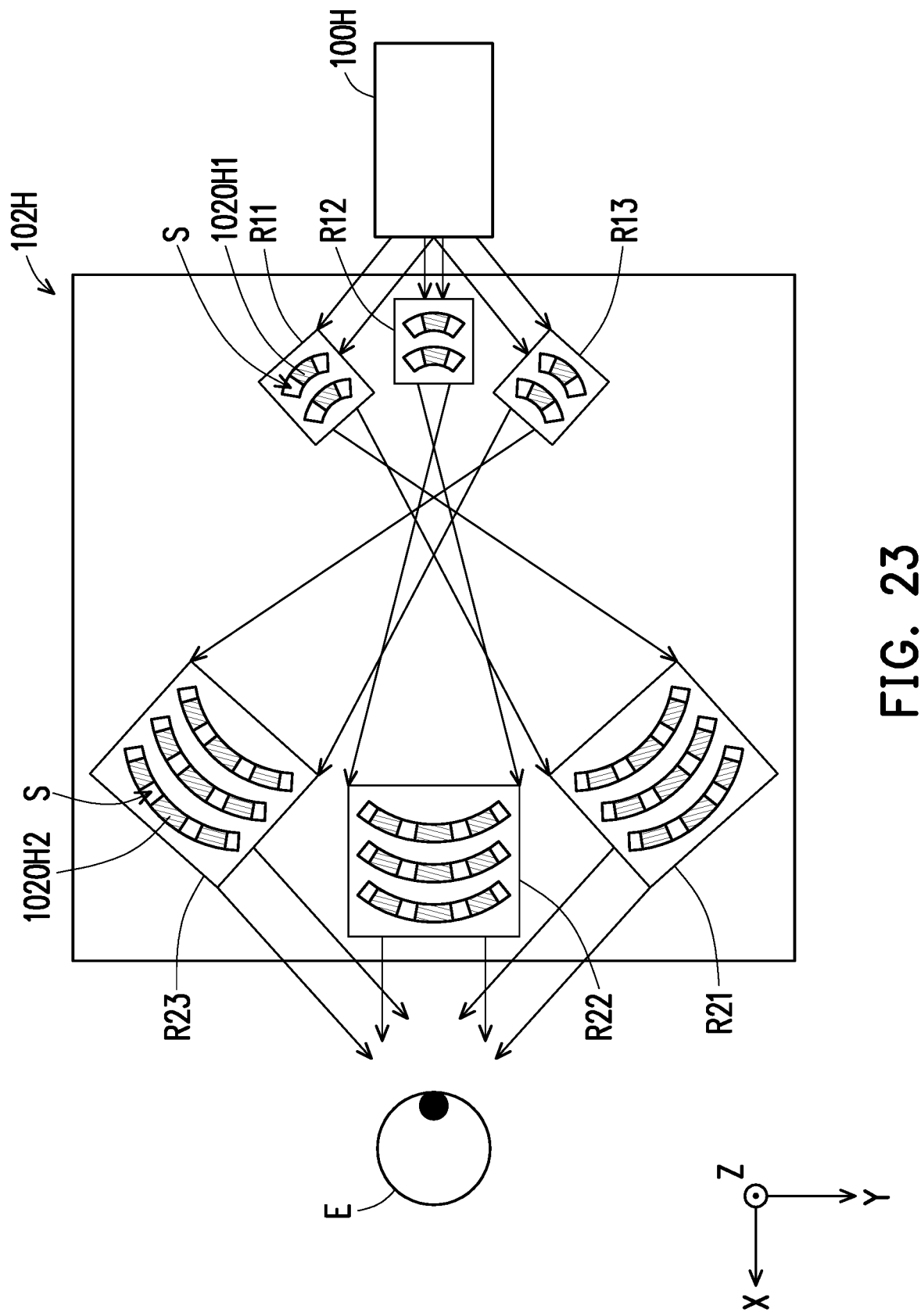
FIGS. 23 and 24 are schematic front views of combiners applicable to a head-mounted display of the disclosure.
Figure 24:
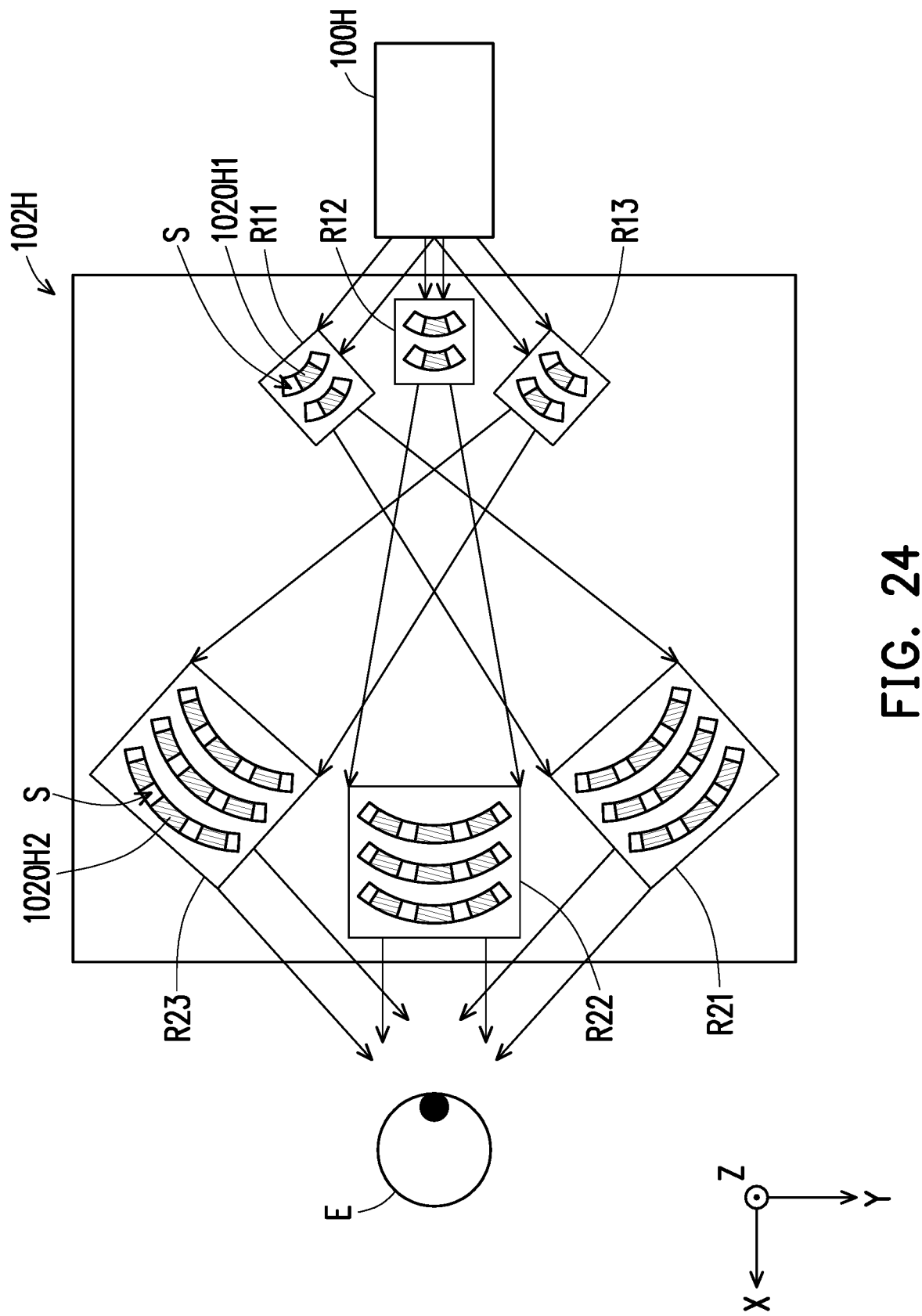

In some embodiments, the reflective elements (including the plurality of first reflective elements and the plurality of second reflective elements) may be the non-curved mirrors shown in any of FIGS. 6, 7 and 19. In some embodiments, the reflective elements (including the plurality of first reflective elements and the plurality of second reflective elements) may be the curved mirrors shown in any of FIGS. 8 and 9. FIGS. 23 and 24 are schematic front views of combiners applicable to a head-mounted display (e.g., the head-mounted display in FIG. 22A) of the disclosure. As shown in FIGS. 23 and 24, by adjusting the direction, position or curvature of the reflective elements (including the plurality of first reflective elements 1020H1 and the plurality of second reflective elements 1020H2) in the sub-regions (including the light input sub regions R11, R12 and R13, and the light output sub regions R21, R22 and R23), the width of the parallel light beam may be increased and the two-dimensional exit-pupil expansion can be achieved. In some embodiments, as shown in FIG. 23, the center of curvature of the reflective elements may face the center portion of the combiner 102H. In some alternative embodiments, as shown in FIG. 24, the center of curvature of the reflective elements may face one side (e.g., the light source side) of the combiner 102H.

Figure 25:
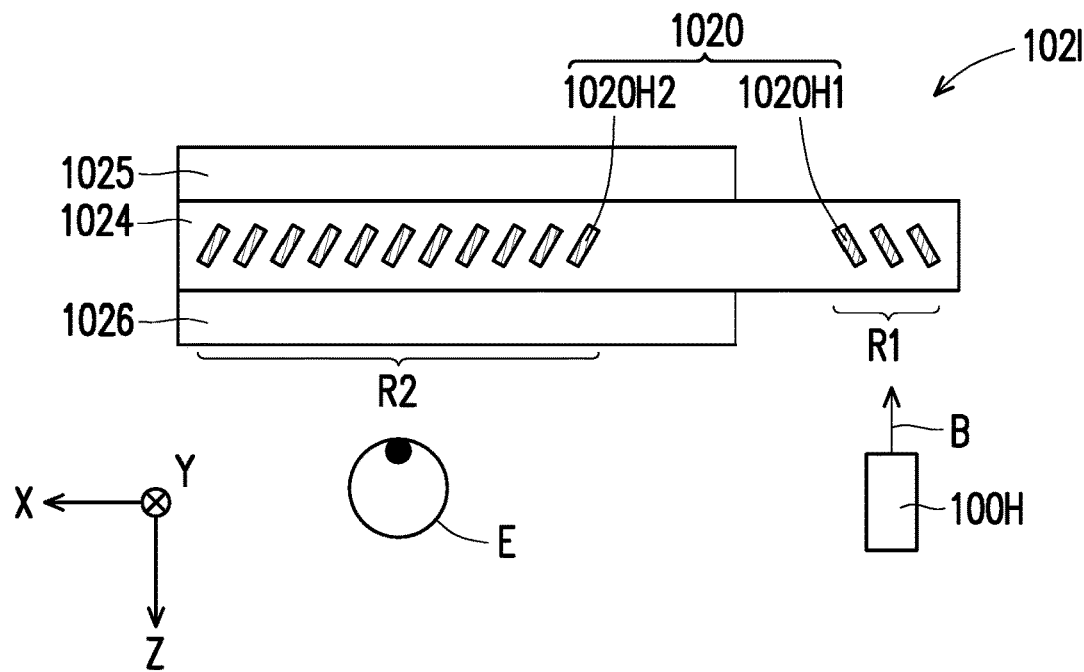
FIGS. 25 and 26 are schematic views of head-mounted displays according to a fourth embodiment and a fifth embodiment of the disclosure.
Figure 26:
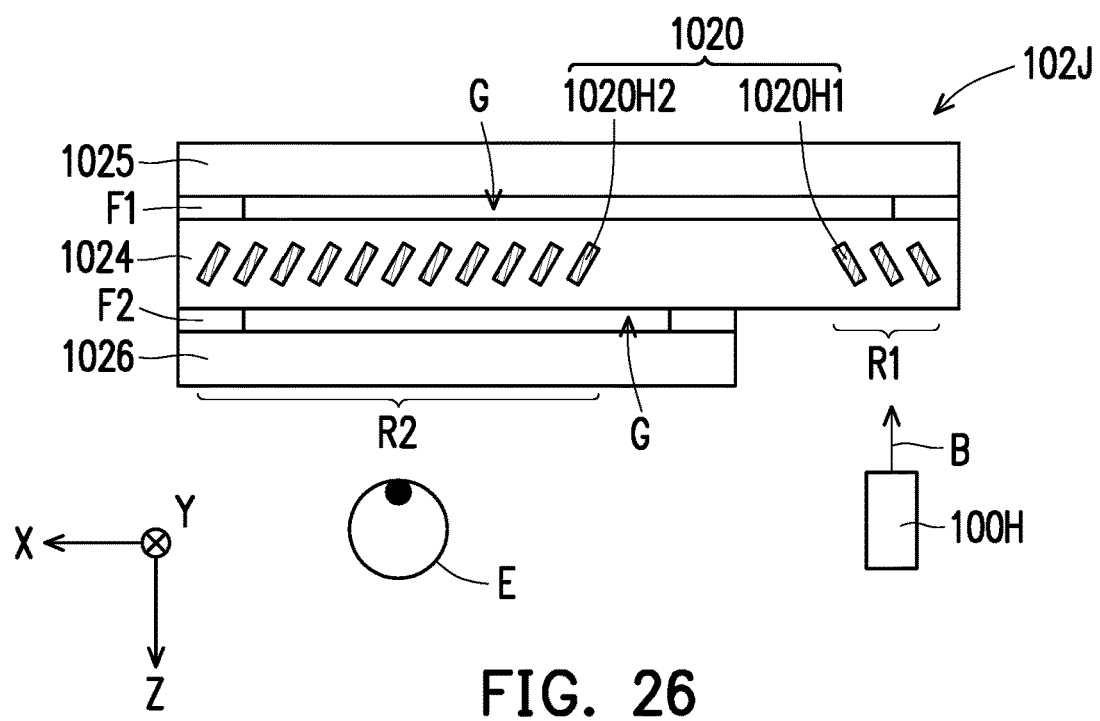

FIGS. 25 and 26 are schematic views of head-mounted displays according to a fourth embodiment and a fifth embodiment of the disclosure. In some embodiments, as shown in FIG. 25, a combiner 102I may include a third substrate 1025 and a fourth substrate 1026 in addition to the light guide plate 1024 and the plurality of reflective elements 1020. The third substrate 1025 and the fourth substrate 1026 may be disposed on opposite sides of the light guide plate 1024 and in contact with the light guide plate 1024, wherein refractive indices of the third substrate 1025 and the fourth substrate 1026 may be smaller than a refractive index of the light guide plate 1024 to facilitate the formation of total internal reflection. In some embodiments, the third substrate 1025 is overlapped with the light output region R2 and not overlapped with the light input region R1 along the direction Z. In some embodiments, the fourth substrate 1026 is overlapped with the light output region R2 and not overlapped with the light input region R1 along the direction Z.

In some embodiments, at least one of the third substrate 1025 and the fourth substrate 1026 may be a lens element to provide vision correction. In the embodiments where the fourth substrate 1026 is a lens element, the imaging position of the virtual image can be adjusted through the fourth substrate 1026. In some embodiments, one of the third substrate 1025 and the fourth substrate 1026 may be a polarizer or having low transmittance, so that the combiner 102I may serve as pigmented or polarized sunglasses. For example, as shown in FIG. 25, the third substrate 1025 located at the back of the plurality of reflective elements 1020 (viewed from the eye E) may be a polarizer or having transmittance lower than that of the fourth substrate 1026, so that the combiner 102I may serve as pigmented or polarized sunglasses. Any of the embodiments (e.g., the embodiment in FIG. 26) disclosed in this disclosure can be modified as described above, and thus will not be repeated below.

In some embodiments, as shown in FIG. 26, a combiner 102J may include fixing elements F1 and F2 in addition to the light guide plate 1024, the plurality of reflective elements 1020, the third substrate 1025 and the fourth substrate 1026. The fixing element F1 fixes the third substrate 1025 to the light guide plate 1024, and the fixing element F2 fixes the fourth substrate 1026 to the light guide plate 1024. In some embodiments, the fixing elements F1 and F2 may be adhesives. In some embodiments, the fixing elements F1 and F2 may have a frame shape, so that center portions of the third substrate 1025 and the fourth substrate 1026 are spaced apart from the light guide plate 1024. In some embodiments, an air gap G is existed between the third substrate 1025 and the light guide plate 1024 and between the fourth substrate 1026 and the light guide plate 1024 to facilitate the formation of total internal reflection. In some embodiments, the fourth substrate 1026 is overlapped with the light output region R2 and not overlapped with the light input region R1 along the direction Z, while the third substrate 1025 is overlapped with the light output region R2 and the light input region R1 along the direction Z.

FIG. 27A is a schematic view of a head-mounted display according to a sixth embodiment of the disclosure. FIG. 27B is a schematic side view of a combiner applicable to a head-mounted display (e.g., the head-mounted display in FIG. 27A) of the disclosure. FIG. 27C is a schematic front view of a combiner applicable to a head-mounted display (e.g., the head-mounted display in FIG. 27A) of the disclosure. FIG. 28 is a schematic front view of an alternative combiner applicable to a head-mounted display (e.g., the head-mounted display in FIG. 27A) of the disclosure.

Referring to FIGS. 27A to 27C and 28, the main difference between a head-mounted display 10 and the head-mounted display 1H in FIG. 18 is described below. In the head-mounted display 10, the plurality of first reflective elements 1020H1 in a combiner 102O of the display module 100 are curved reflective elements. By controlling the curvatures or inclination angles of the plurality of reflective elements 1020 (e.g. the plurality of first reflective elements 1020H1), the imaging size and image distance of the virtual image can be tuned without the need of additional optical elements, thereby reducing the space occupied by the light engine. In some embodiments, the plurality of first reflective elements 1020H1 may be fractured parabolic reflector elements. In some embodiments, the plurality of first reflective elements 1020H1 may form a micro-mirror array (or Fresnel mirror) with gradual variation of curvatures. In some embodiments, by changing the slope and curvature of the cross-section of the reflective elements in the light input region R1 and the radian and direction of the reflective elements on the X-Y plane, the imaging position, size or FoV can be changed, and the effect of Fresnel mirror can be achieved. The light source 1000 may include a projector or a micro display.

Figure 29:
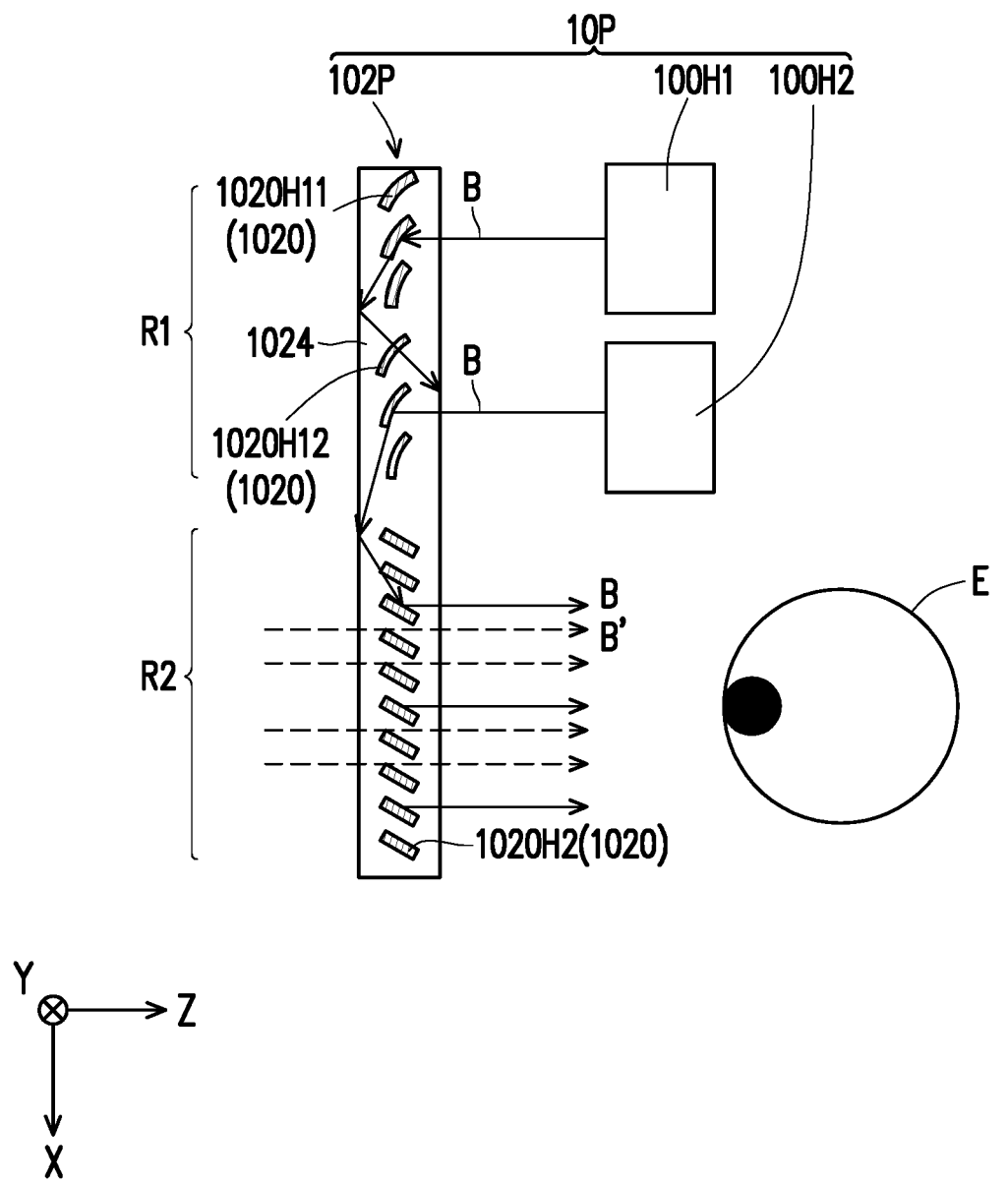
FIG. 29 is a schematic view of a head-mounted display according to a seventh embodiment of the disclosure.

FIG. 29 is a schematic view of a head-mounted display according to a seventh embodiment of the disclosure. Referring to FIG. 29, the main difference between a head-mounted display 1P and the head-mounted display 10 in FIG. 27A is described below. In the head-mounted display 1P, the display module 10P includes a plurality of the light sources (e.g. light source 100H1 and light source 100H2). Correspondingly, the light input region R1 of the light guide plate 1024 includes a plurality of light input sub regions (e.g. light input sub regions R11 and R12) overlapped with the plurality of the light sources (e.g. light source 100H1 and light source 100H2), respectively. The plurality of reflective elements 1020 may include a plurality of first reflective elements 1020H11 disposed in the light input sub region R11 and a plurality of first reflective elements 1020H12 disposed in the light input sub regions R12 in addition to the plurality of second reflective elements 1020H2.

In some embodiments, the plurality of first reflective elements 1020H11 and the plurality of first reflective elements 1020H12 may have different curvatures or different inclination angles. The design parameter (e.g., the arrangement) of the plurality of first reflective elements 1020H11 and the plurality of first reflective elements 1020H12 may be referred to the description in FIG. 27A, and will not be repeated here.

In some embodiments, multiple imaging distances can be achieved through light source selection and/or the design of the combiner. In some embodiments, the light source 100H1 and the light source 100H2 are projectors having different imaging distances, and the plurality of first reflective elements 1020H11 and the plurality of first reflective elements 1020H12 may be non-curved mirrors with the same curvature or with gradual variation of curvatures; or the plurality of first reflective elements 1020H11 and the plurality of first reflective elements 1020H12 may be curved mirrors with gradual variation of curvatures (as shown in FIG. 29). In some alternative embodiments, the light source 100H1 and the light source 100H2 are projectors having the same imaging distances, and the plurality of first reflective elements 1020H11 and the plurality of first reflective elements 1020H12 may be non-curved mirrors with gradual variation of inclination angles or curved mirrors with gradual variation of curvatures. In some alternative embodiments, the light source 100H1 and the light source 100H2 are micro displays, and the plurality of first reflective elements 1020H11 and the plurality of first reflective elements 1020H12 may be non-curved mirrors with gradual variation of inclination angles or curved mirrors with gradual variation of curvatures.

Figure 30:
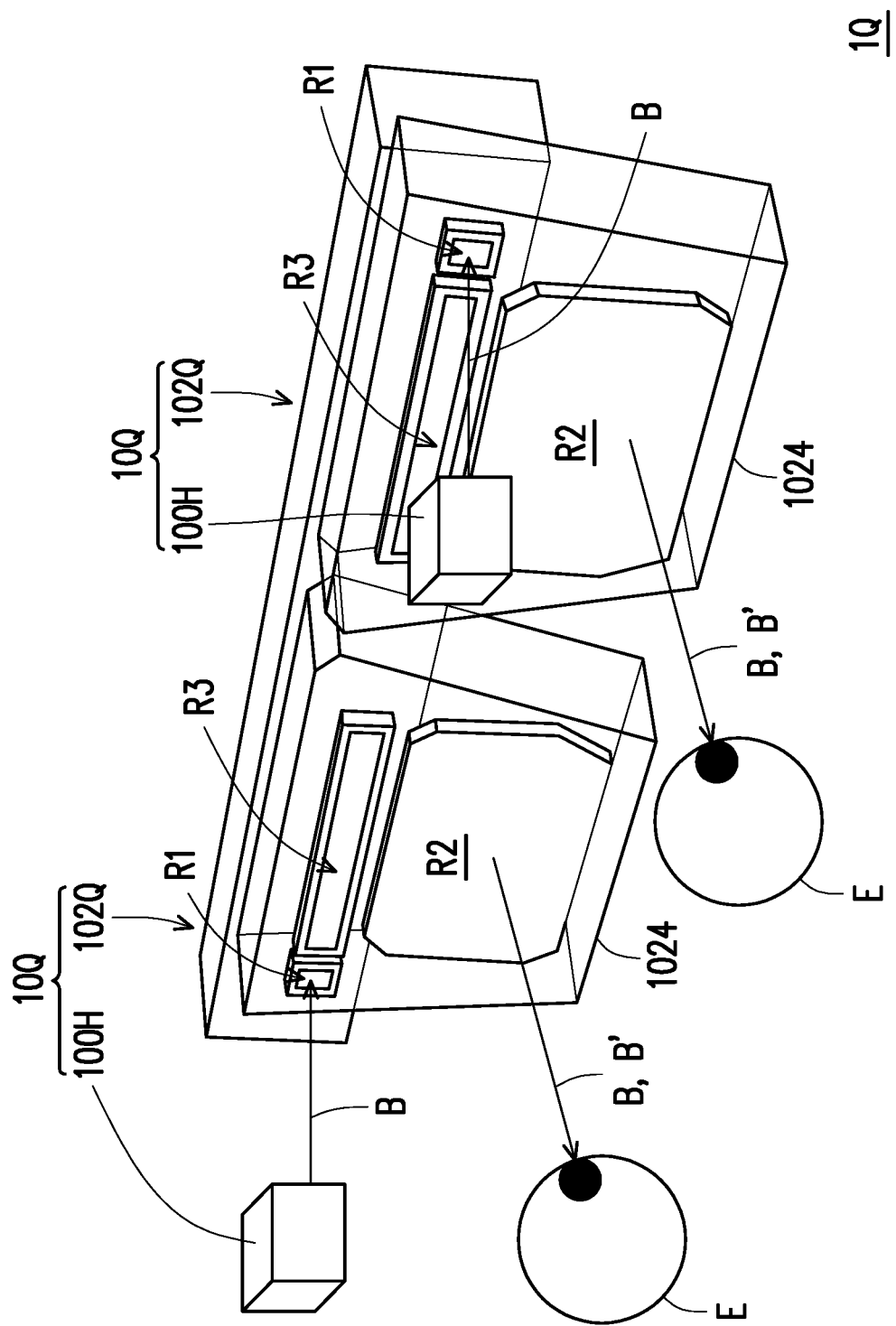
FIG. 30 is a schematic view of a head-mounted display according to an eighth embodiment of the disclosure.
Figure 31:
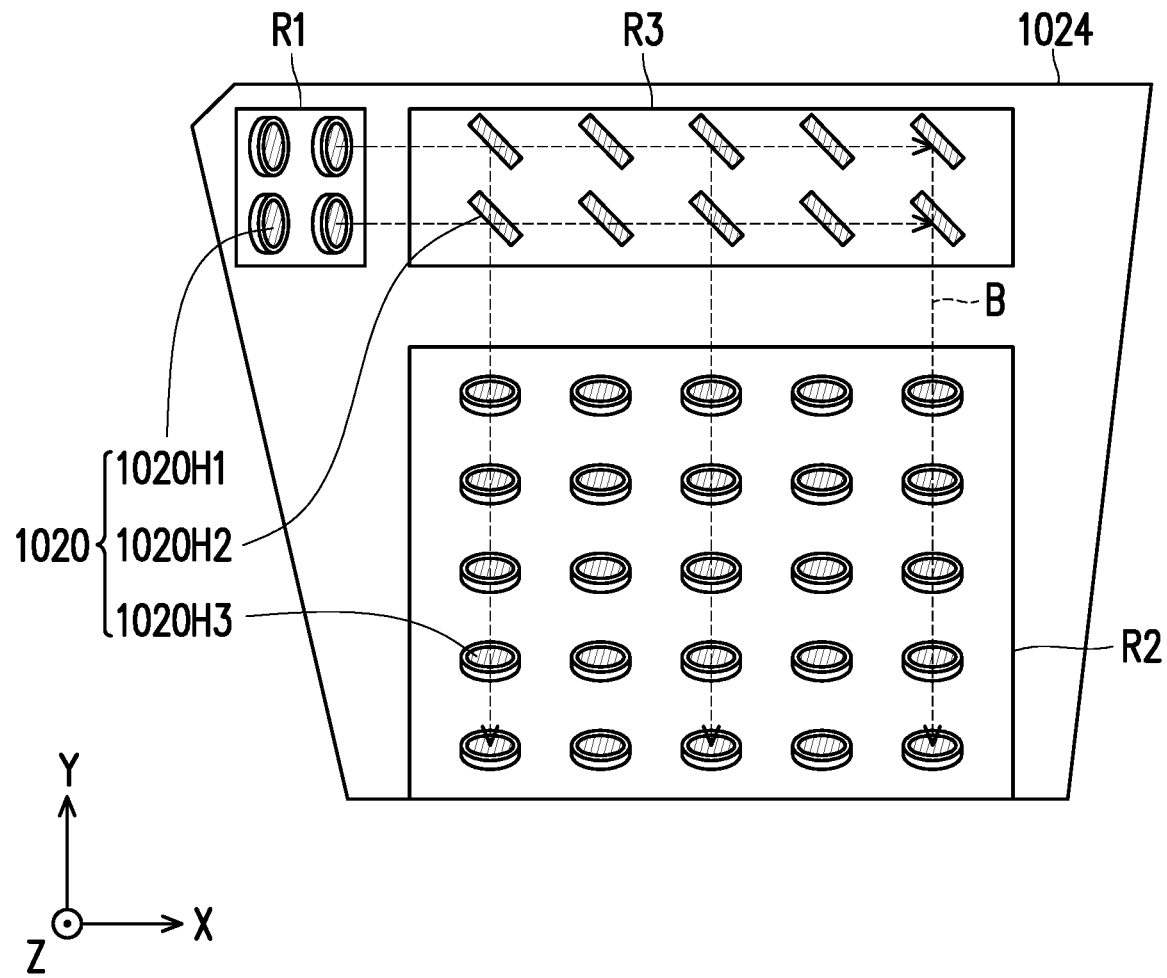
FIG. 31 is a schematic front view of a combiner applicable to a head-mounted display of the disclosure.

FIG. 30 is a schematic view of a head-mounted display according to a seventh embodiment of the disclosure. FIG. 31 is a schematic front view of a combiner applicable to a head-mounted display (e.g. the head-mounted display in FIG. 30) of the disclosure. Referring to FIGS. 30 and 31, the main difference between a head-mounted display 1Q and the head-mounted display 1H in FIG. 18 is described below.

In the head-mounted display 1Q, the light guide plate 1024 of a combiner 102Q in each display module 10Q includes a transition region R3 in addition to the light input region R1 and the light output region R2. The light input region R1 and the light output region R2 are located on two adjacent sides of the transition region R3. The plurality of reflective elements 1020 may include a plurality of third reflective elements 1020H3 in addition to the plurality of first reflective elements 1020H1 and the plurality of second reflective elements 1020H2. The plurality of third reflective elements 1020H3 are disposed in the transition region R3 of the light guide plate 1024, wherein the plurality of first reflective elements 1020H1, the plurality of second reflective elements 1020H2 and the plurality of third reflective elements 1020H3 have different oblique directions. Specifically, the plurality of first reflective elements 1020H1 are configured to reflect the light beam B from the light source 100H to the plurality of third reflective elements 1020H3, the plurality of third reflective elements 1020H3 are configured to reflect the light beam B from the plurality of first reflective elements 1020H1 to the plurality of second reflective elements 1020H2, and the plurality of second reflective elements 1020H2 are configured to reflect the light beam B from the plurality of third reflective elements 1020H3 to the eye E of the user. In some embodiments, the plurality of third reflective elements 1020H3 are formed from the manufacturing process shown in FIG. 13, but not limited thereto.

In some embodiments, each display module 10Q may include more than one light sources and more than one optical elements to increase the depth of field of the virtual images as described in FIG. 32. Alternatively, each display module 10Q may include more than one light sources, and the reflective elements located in front of the plurality of light sources may have different curvatures or different inclination angles to increase the depth of field of the virtual images without the need of the optical elements.

In the embodiments of the head-mounted display, the combiner reflects the light beam from the light source through the reflective elements that are spaced apart from each other and obliquely disposed, and each reflective element has a maximum width that is less than 4 mm and greater than 10 μm along an oblique direction thereof. As such, the possibility that the user perceives the presence of the reflective elements may be reduced and the influence of the diffraction effect on the image quality (such as color dispersion) can be avoided. Therefore, the head-mounted display in the embodiments of the disclosure can improve at least one of the problems (e.g. low light utilization rate, low contrast ratio, color dispersion, small field of view, large volume, heavy weight or difficult to combine with lens elements) in the existing technique.

In some embodiments, the uniformity of the intensity of the image (e.g. the virtual image or the actual image) can be improved by controlling the distribution, arrangement, or reflectance (or transmittance) of the plurality of reflective elements. In some embodiments, the field of view or eye box can be improved by controlling curvatures or inclination angles of the reflective elements. In some embodiments, the field of view or the imaging size or position of the virtual image can be improved by disposing optical element(s) between the light source and the combiner. In some embodiments, the head-mounted display can further provide vision correction or sunglass functions by combining lens element (s) or pigmented or polarized sunglasses into the combiner. In some embodiments, the head-mounted display may be a waveguide type head-mounted display or a projection type head-mounted display. In some embodiments, the depth of field of the virtual images can be increased by disposing convex lens elements, concave mirrors or focus tunable lenses with different curvatures between the light sources and the combiner. In some embodiments, the depth of field of the virtual images can be increased by controlling curvatures or inclination angles of the reflective elements located in front of the light sources.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A head-mounted display, comprising:
 a display module, comprising:
  a light source configured to provide a light beam; and
  a combiner disposed on a transmission path of the light beam and comprising a plurality of reflective elements spaced apart from each other and obliquely disposed, wherein a maximum width of each of the plurality of reflective elements along an oblique direction thereof is less than 4 mm and greater than 10 μm.

2. The head-mounted display according to claim 1, wherein the light source comprises a pico-projector, a liquid crystal on silicon display, a digital light processing projector, a micro organic light emitting diode display, a micro light emitting diode display, a micro liquid crystal display, or a laser beam scanning display.

3. The head-mounted display according to claim 1, wherein each of the plurality of reflective elements comprises a metal layer, an alloy layer, a distributed Bragg reflector, a semi-reflection layer, an absorption layer or a combination of at least two of the above.

4. The head-mounted display according to claim 1, wherein the plurality of reflective elements have gradual variation of curvatures or inclination angles.

5. The head-mounted display according to claim 1, wherein the combiner further comprises a first substrate and a plurality of columnar structures disposed on the first substrate, each of the plurality of columnar structures has an inclined surface, and the plurality of reflective elements are disposed on the inclined surfaces of the plurality of columnar structures in a conformal manner.

6. The head-mounted display according to claim 5, wherein the inclined surfaces of the plurality of columnar structures comprise flat surfaces, convex surfaces, concave surfaces or a combination of at least two of the above, which are inclined with respect to the first substrate.

7. The head-mounted display according to claim 5, wherein a shape of an orthographic projection of the inclined surface of each of the plurality of columnar structures on the first substrate is rectangular or partial ring.

8. The head-mounted display according to claim 5, wherein the combiner further comprises a second substrate overlapped with the first substrate, the plurality of columnar structures and the plurality of reflective elements.

9. The head-mounted display according to claim 8, wherein the combiner further comprises a fixing element fixing the first substrate and the second substrate, and the plurality of reflective elements are spaced apart from the second substrate.

10. The head-mounted display according to claim 8, wherein at least one of the first substrate and the second substrate is a lens element.

11. The head-mounted display according to claim 8, wherein the first substrate is a flexible film attached to the second substrate, and the first substrate is located between the second substrate and the plurality of columnar structures.

12. The head-mounted display according to claim 1, wherein the combiner further comprises a light guide plate, and the plurality of reflective elements are disposed in the light guide plate.

13. The head-mounted display according to claim 12, wherein the plurality of reflective elements are arranged along the same oblique direction.

14. The head-mounted display according to claim 12, wherein the plurality of reflective elements are arranged along two or more oblique directions.

15. The head-mounted display according to claim 12, wherein the light guide plate has a light input region and a light output region, the plurality of reflective elements comprise a plurality of first reflective elements disposed in the light input region and a plurality of second reflective elements disposed in the light output region, wherein the plurality of first reflective elements and the plurality of second reflective elements have the same or different oblique directions.

16. The head-mounted display according to claim 15, wherein the light input region have a plurality of light input sub regions, and the plurality of first reflective elements disposed in different light input sub regions have different oblique directions, the light output region have a plurality of light output sub regions, and the plurality of second reflective elements disposed in different light output sub regions have different oblique directions.

17. The head-mounted display according to claim 16, wherein the plurality of first reflective elements and the plurality of second reflective elements are curved reflective elements.

18. The head-mounted display according to claim 15, wherein the plurality of first reflective elements are curved reflective elements, and the plurality of first reflective elements have gradual variation of curvatures.

19. The head-mounted display according to claim 1, wherein the display module comprises a plurality of the light sources, and reflective elements, among the plurality of reflective elements, located in front of the plurality of light sources have different curvatures or different inclination angles.

20. The head-mounted display according to claim 19, wherein the reflective elements located in front of the plurality of light sources have gradual variation of curvatures.

* * * * *